(12) United States Patent
Bremer et al.

(10) Patent No.: US 12,124,959 B2
(45) Date of Patent: Oct. 22, 2024

(54) METHOD AND SYSTEM FOR PROCESSING DATA RECORDS

(71) Applicant: International Business Machines Corporation, Armonk, NY (US)

(72) Inventors: Lars Bremer, Boeblingen (DE); Jonathan Roesner, Leimersheim (DE); Claudio Andrea Fanconi, Celerina (CH); Martin Oberhofer, Sindelfingen (DE); Karin Steckler, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 17/116,032

(22) Filed: Dec. 9, 2020

(65) Prior Publication Data

US 2021/0374525 A1 Dec. 2, 2021

(30) Foreign Application Priority Data

May 28, 2020 (EP) ..................................... 20176986

(51) Int. Cl.
*G06N 3/08* (2023.01)
*G06F 16/215* (2019.01)
(Continued)

(52) U.S. Cl.
CPC ........... *G06N 3/084* (2013.01); *G06F 16/215* (2019.01); *G06F 18/214* (2023.01); *G06F 18/22* (2023.01);
(Continued)

(58) Field of Classification Search
CPC ........... G06N 3/084; G06N 3/04; G06N 3/08; G06N 3/045; G06N 20/00; G06F 16/215;
(Continued)

(56) References Cited

U.S. PATENT DOCUMENTS 8,463,750 B2   6/2013   Kazi et al.
10,565,233 B2  2/2020   Deng et al.
(Continued)

FOREIGN PATENT DOCUMENTS

CN     101464910 A    6/2009
CN     106227745 A    12/2016
(Continued)

OTHER PUBLICATIONS

Sim, "Record2Vec: Unsupervised Representation Learning for Structured Records", 2018 IEEE International Conference on Data Mining. (Year: 2018).*
(Continued)

*Primary Examiner* — Dave Misir
(74) *Attorney, Agent, or Firm* — Tihon Poltavets

(57) ABSTRACT

The present disclosure relates to a method comprising providing a set of one or more records, each record of the set of records having a set of one or more attributes. Values of the set of attributes of the set of records may be input to a trained data representation learning model for receiving, as an output of the trained data representation model, a set of feature vectors representing the set of records respectively. The set of feature vectors may be stored.

25 Claims, 14 Drawing Sheets

(51) Int. Cl.
*G06F 18/214* (2023.01)
*G06F 18/22* (2023.01)
*G06F 18/2413* (2023.01)
*G06N 3/04* (2023.01)
*G06N 3/084* (2023.01)

(52) U.S. Cl.
CPC ......... *G06F 18/24137* (2023.01); *G06N 3/04* (2013.01); *G06N 3/08* (2013.01)

(58) Field of Classification Search
CPC .. G06F 18/22; G06F 18/24137; G06F 18/214; G06F 18/213
See application file for complete search history.

(56) References Cited

U.S. PATENT DOCUMENTS

| | | | |
|---|---|---|---|
| 10,607,010 | B2 | 3/2020 | Krejdl |
| 2009/0307213 | A1 | 12/2009 | Deng et al. |
| 2017/0184516 | A1 | 6/2017 | Chen |
| 2018/0174001 | A1* | 6/2018 | Kang ............... G06F 18/214 |
| 2019/0354689 | A1* | 11/2019 | Li .................. G06F 21/563 |
| 2020/0065563 | A1* | 2/2020 | Zou ................. G06N 3/045 |
| 2020/0272845 | A1* | 8/2020 | He ............... G06F 18/24133 |
| 2020/0357060 | A1* | 11/2020 | Dalinina ............ G06F 18/2113 |
| 2020/0379868 | A1* | 12/2020 | Dherange ............ G06N 20/20 |
| 2021/0342634 | A1* | 11/2021 | Chen ................. G06V 10/82 |

FOREIGN PATENT DOCUMENTS

| | | |
|---|---|---|
| CN | 107885853 A | 4/2018 |
| CN | 105652330 B | 6/2018 |
| CN | 110569289 A | 6/2020 |
| WO | 2021047373 A1 | 3/2021 |

OTHER PUBLICATIONS

Marcus, "Flexible Operator Embeddings via Deep Learning", Jan. 2019. (Year: 2019).*
Krivosheev, "Siamese Graph Neural Networks for Data Integration", Jan. 2020. (Year: 2020).*
Bromley et al., "Signature Verification using a "Siamese" Time Delay Neural Network," American Telephone and Telegraph Company, 1994, 8 pages.
Bremer et al., "Method and System for Processing Data Records Background," Application No. EP20176986.6, Filed May 28, 2020.
Notification of Transmittal of the International Search Report and the Written Opinion of the International Searching Authority, or the Declaration, mailed Jul. 27, 2021 for International Application No. IB2021/053162 8 pgs.

* cited by examiner

– 1 –
METHOD AND SYSTEM FOR PROCESSING DATA RECORDS

BACKGROUND

The present invention relates to the field of digital computer systems, and more specifically, to a method for processing data records.

Storing and processing data may be a prerequisite to successful functioning of data management systems. For example, removing duplicate records or finding matches in a database is a crucial step in the data cleansing process, because duplicates can severely influence the outcomes of any subsequent data processing or data mining. The matching process for record linkage becomes more complex with the increasing complexity involved in a high number of different attributes required across different geographic regions, countries, etc. and constitutes one of the major challenges for record linkage algorithms.

SUMMARY

Various embodiments provide a method for processing data records, computer system and computer program product as described by the subject matter of the independent claims. Advantageous embodiments are described in the dependent claims. Embodiments of the present invention can be freely combined with each other if they are not mutually exclusive.

In one aspect, the invention relates to a method comprising: providing a set of one or more records, each record of the set of records having a set of one or more attributes, inputting values of the set of attributes of the set of records to a trained data representation learning model, thereby receiving, as an output of the trained data representation model, a set of feature vectors representing the set of records respectively, storing the set of feature vectors In another aspect, the invention relates to a computer program product comprising a computer-readable storage medium having computer-readable program code embodied therewith, the computer-readable program code configured to implement all of the steps of the method according to preceding embodiments.

In another aspect, the invention relates to a computer system configured for: inputting values of a set of attributes of a set of one or more records to a trained data representation learning model, thereby receiving, as an output of the trained data representation model, a set of feature vectors representing the set of records respectively, and storing the set of feature vectors.

The present subject matter may enable an efficient storage and representation of data records of a database. The generated set of feature vectors may have the advantage of saving storage resources and providing a compact or alternative storage solution for the storage of data records. The generated set of feature vectors may further have the advantage of optimizing the processing of the data records by using them instead of the records. For example, a matching of the feature vectors instead of the records may be fast, efficient and reliable. Using a trained data representation learning model may provide an accurate and controllable definition of a vector space for representing the records. The vector space may, for example, be defined so that duplicate feature vectors may be identified by simplified vector operations of the vector space. An example vector operation may be a distance function.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
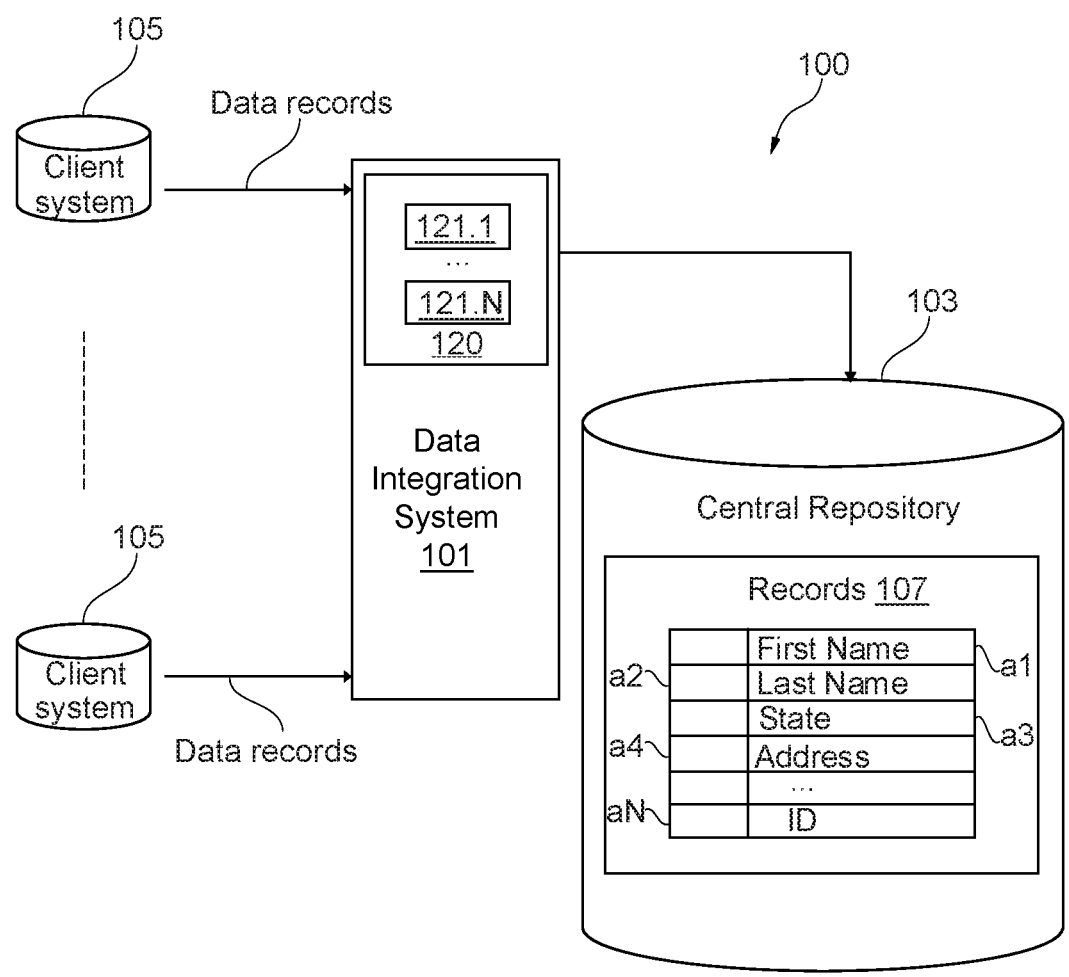
FIG. 1 is a block diagram of a computer system in accordance with an example of the present subject matter.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A data record or record is a collection of related data items such as a name, date of birth and class of a particular user. A record represents an entity, wherein an entity refers to a user, object, or concept about which information is stored in the record. The terms "data record" and "record" are interchangeably used.

A dataset may comprise the set of records being processed by the present subject matter. For example, the dataset may be provided in the form of a collection of related records contained in a file (e.g., the dataset may be a file containing records of all students in class). The dataset may, for example, be a table of a database or a file of a Hadoop file system, etc. In another example, the dataset may comprise one or more documents such as a HyperText Markup Language (HTML) page or other document types.

The dataset may, for example, be stored in a central repository. The computer system may be configured to access the central repository (e.g., the central repository may or may not be part of the computer system). The central repository may be a data store or storage that stores data received from multiple client systems. The dataset may comprise a subset of existing records of the central repository that are identified or selected in order to be processed. The subset of records may, for example, be selected based on values of one or more attributes of the records (e.g., the subset of records may represent entities belonging to a given country or region). The records of the dataset may, for example, be pre-processed before being processed. The pre-processing may, for example, comprise transforming the format of the attribute values of the records of the dataset. For example, attribute values may be uppercased, their noise characters (such as - . / characters) may be removed and anonymous attribute values (like a city=nowhere or first name=Test) may be removed.

The data representation learning model is configured to output a feature vector for a record such that the distance between two feature vectors generated based on two records using the data representation learning model is a measure for the similarity of the attributes of the two records. For example, the data representation learning model may be trained to take as its input records and produce a vector space, typically of d dimensions, with each unique record being assigned a corresponding vector in the space. Feature vectors may be positioned in the vector space such that records that are similar or share attribute values are located close to one another in the space. A feature vector may be an ordered array of single numbers. A feature vector may be an example of a 1st-order tensor.

In one example, the trained data representation learning model may be one similarity encoder that is configured to receive the set of one or more attributes of a record and to generate a feature vector that represents the record. The feature vector may, for example, be obtained by processing collectively the values of the set of attributes, or may be obtained as a combination of individual feature vectors associated with the set of attributes, wherein the similarity encoder is configured to consecutively receive the values of the set of attributes and to generate associated individual feature vectors.

In another example, the trained data representation learning model may comprise one similarity encoder per attribute of the set of attributes of a record, wherein each similarity encoder of the similarity encoders is configured to receive a respective attribute of the set of attributes and to generate a corresponding individual feature vector. The individual feature vectors may be combined to obtain a feature vector that represents the record.

In another example, the trained data representation learning model may be a neural network that is configured to receive the set of one or more attributes of a record and to generate a feature vector that represents the record. In another example, the trained data representation learning model may comprise one neural network per attribute of the set of attributes of a record, wherein each neural network of the neural networks is configured to receive a respective attribute of the set of attributes and to generate a corresponding individual feature vector. The individual feature vectors may be combined to obtain a feature vector that represents the record.

The combination of individual feature vectors may be a concatenation or appending of elements of the individual feature vectors into the feature vector such that the feature vector comprises the elements of the individual feature vectors.

Methods consistent with the present disclosure may, for example, be deployed and used in Big Data solutions, (e.g., IBM's Big Match technology running on IBM BigInsights®, CLOUDERA and HORTONWORKS) and with information integration software (e.g., INFORMATICA POWERCENTER, IBM® Information Server). Computer systems consistent with the present disclosure may, for example, be a master data management (MDM) system.

In some embodiments, methods consistent with the present disclosure may comprise receiving a record having the set of attributes. Values of the set of attributes of the received record may be input to the trained data representation learning model for obtaining a feature vector of the received record from the trained data representation learning model. The obtained feature vector may be compared with at least part of the set of feature vectors for determining a matching level of the obtained feature vector with the set of feature vectors. The obtained feature vector and/or received record may be stored based on the matching level. In one example, the obtained feature vector may be compared with each feature vector of the set of feature vectors. In another example, the obtained feature vector may be compared with each feature vector of a selected subset of the set of feature vectors.

A conventional matching algorithm may use a bucketing feature. However, if the buckets are too large (e.g., more than 1000-1500 records), matching performance may degrade to the point where matching may become unusable for real-time. In addition, creating a good bucketing strategy to avoid such large buckets may require deep human subject matter expertise which is hard to get and expensive. Also, re-bucketing may require human expertise and several tuning iterations (e.g., 4-6 weeks). Some embodiments may advantageously solve these issues by using a vector space that enables an easy matching of feature vectors in large buckets. The matching in accordance with such embodiments may not be limited to a low threshold number of attributes because the distance computation at vector level allows a matching of a high number of attributes. Comparison functions like edit-distance and phonetic distance may work well on simple attributes like a first name attribute, but these comparison functions may not work on free-text fields like a 200-word product description. This may be solved using the feature vectors. For that, the content of the free-text description is encoded in a vector and close vectors refer to similar free-text descriptions.

According to one embodiment, the storing of the set of feature vectors comprises clustering the set of feature vectors into clusters and associating each of the stored feature vectors with cluster information indicative of a cluster corresponding to the feature vector. Storing the feature vectors as clusters may be advantageous as it may enable an optimal access to the stored data based on the clusters. For example, queries for accessing the stored data may be refined using criteria on the clusters. This may speed up the access to the data.

According to one embodiment, the storing of the set of feature vectors comprises clustering the set of feature vectors into clusters. The method of this embodiment further comprise determining a distance between the obtained feature vector and each cluster of the clusters, wherein the at least part of the set of feature vectors comprises the cluster of feature vectors having a closest distance to the obtained feature vector. That is, the selected subset of the set of feature vectors comprises features vectors of the cluster of feature vectors having the closest distance to the obtained feature vector. The distance between a cluster and the obtained feature vector may be the distance between the obtained feature vector and a vector representing the cluster of the feature vectors. The vector representing the cluster may, for example, be a centroid of the cluster of the feature vectors. In another example, any feature vector of the cluster may be the vector representing the cluster.

This embodiment may speed up the matching process and may thus save processing resources that would otherwise be required to do matching with every stored feature vector. The matching process enabled by this embodiment may thus be used in real-time (e.g., during operation of MDM systems).

According to one embodiment, the method is performed in real time, wherein the record is received as part of a create or update operation. For example, the method may be performed at runtime of the MDM system. For example, in response to receiving a data record, the present method may automatically be executed on that record. For example, in order to run a record matching process in real-time within create/update operations, the matching process may need to be completed in 100 milliseconds or less. Using the feature vectors in accordance with the present subject matter may enable to reduce the matching process time to a level required by real-time processing.

According to one embodiment, the trained data representation learning model is configured to output a feature vector of the set of feature vectors by generating for each attribute of the set of attributes an individual feature vector and combining the individual features vectors to obtain said feature vector. By processing the attributes at an individual level, this embodiment may enable to access features of the records in more details and may thus provide a reliable representation of the records.

The data representation learning model may, for example, comprise a similarity encoder per attribute of the set of attributes, wherein the similarity encoder is configured to output an individual feature vector for an associated attribute of the set of attributes such that the distance between two individual feature vectors generated based on two attributes using the similarity encoder is a measure for the similarity of the two attributes.

According to one embodiment, the trained data representation learning model is configured to receive the input values and output the set of feature vectors in parallel. That is, the data representation learning model is configured to process in parallel (or concurrently) the values of the set of attributes and to generate in parallel (or concurrently) the outputs. This may, for example, further speedup the matching process in accordance with the present subject matter.

According to one embodiment, the trained data representation learning model comprises a set of attribute level trained data representation models associated with the set of attributes respectively, wherein the output of each feature vector of the set of feature vectors comprises: inputting the value of each attribute of the set of attributes into the associated attribute level trained data representation model, receiving, in response to the inputting, an individual feature vector from each of the attribute level trained data representation models, and combining the individual feature vectors to obtain said feature vector. The combination of the individual feature vectors may be a concatenation or appending of elements of the individual feature vectors into said feature vector such that said feature vector comprises the elements of the individual feature vectors.

This embodiment may enable to structure the data representation learning model into pipelines. Each compared attribute belongs to one pipeline. Each pipeline predicts the similarity of its attribute. This may be advantageous as it may provide a scalable structure. This may enable to handle a growing number of attributes by adding new pipelines. For example, the pipeline approach may allow customers to add new pipelines in order to predict on attributes that are unique to that customer (e.g., a unique id of a certain customer).

According to one embodiment, the trained data representation learning model further comprises a set of trained weights associated with the set of attributes respectively, wherein the combining comprises weighting each of the individual feature vectors with a respective trained weight of the set of trained weights and combining by, e.g., concatenating the weighted individual feature vectors. This may enable to control the prediction process on attribute level by changing the set of weights depending on their corresponding attributes. For example, the weight associated with a given attribute may be changed, during the training, differently compared to other attributes. This weighting process happens as part of the learning step in the data representation learning model.

This embodiment may further allow a customer to weight the impact on the different comparisons. For example, a customer might have a high quality on address data. Therefore, the comparison on the address fields may have a high impact on the overall prediction. The customer may thus change the trained weight associated with the address data.

According to one embodiment, each of the attribute level trained data representation models is a neural network.

According to one embodiment, the trained data representation learning model is trained for optimizing a loss function. In one example, the trained data representation learning model is trained with backpropagation for optimizing the loss function. The loss function may be indicative of (or function of) a measure of a similarity between feature vectors of a pair of records. The measure of similarity may be a combination of individual similarities. Each individual similarity of the individual similarities indicates a similarity of the two individual feature vectors generated for the same attribute in the pair of records. The measure of similarity between two feature vectors may, for example, be Euclidian distance, cosine distance, or a difference of the pairwise elements of the two feature vectors.

According to one embodiment, the trained data representation learning model is trained for optimizing a loss function, wherein the loss function is a measure of a similarity between feature vectors of a pair of records. In one example, the trained data representation learning model is trained with backpropagation for optimizing the loss function.

According to one embodiment, the trained data representation learning model comprises at least one neural network that is trained in accordance with a Twin Neural Network (sometimes referred to in the art as a "Siamese Neural Network") architecture. For example, the neural network of the trained data representation learning model may be one of the two networks of the trained Twin Neural Network (TNN). This may be advantageous because a TNN realizes a non-linear embedding of data with the objective being to attain a semantically meaningful space where related patterns (e.g., records of the same entity) are close to each other while proximity of semantically-unrelated patterns (e.g., records of different entities) are avoided. The comparison between feature vectors may be simplified using distances. In another example, the trained data representation learning model comprises an autoencoder.

According to one embodiment, the trained data representation learning model comprises one trained neural network per attribute of the set of attributes, wherein the output of each feature vector of the set of feature vectors comprises: inputting the value of each attribute of the set of attributes into the associated trained neural network, receiving, in response to the inputting, an individual feature vector from each of the trained neural networks, and combining the individual feature vectors to obtain said feature vector.

According to one embodiment, the method further comprises: receiving a training dataset comprising pairs of records having the set of attributes, wherein each pair is labelled and training a data representation learning model using the training dataset for generating the trained data representation learning model. The data representation learning model may be trained in a supervised manner, using pairs of records wherein each pair of records is labelled by a predefined label. The label of a pair of records may indicate "same" or "different," where "same" means that the pair of records represent a same entity and "different" means that these two records belong to different physical entities (e.g., persons).

According to one embodiment, the data representation learning model comprises a set of attribute level data representation models associated with the set of attributes respectively. The training of the data representation learning model comprises, for each pair of records and for each attribute of the set of attributes: inputting a pair of values of the attribute (in the pair of records) to the corresponding attribute level data representation model, thereby obtaining a pair of individual feature vectors, calculating an individual similarity level between the pair of individual feature vectors, and weighting the individual similarity level with a trainable weight of the attribute. The training of the data representation learning model further comprises, for each pair of records: determining a measure of a similarity between feature vectors of the pair of records as a combination of the individual weighted similarity levels, and evaluating a loss function using the measure. The evaluated loss function may be used in a minimization process during the training of the data representation learning model. The combination of the individual weighted similarity levels may be the sum of the individual weighted similarity levels.

The trainable parameters of the set of attribute level data representation models and the set of weights may be changed during the training in order to achieve an optimal value of the loss function. For example, the set of weights may increase the significance of an attribute over another. For that, the set of weights may be changed during the training differently for the set of attributes. In a first weight change configuration, the set of attributes may be ranked in accordance with a user defined priority, and the weights may be changed with an amount (delta value) which is dependent on their ranking. In another example, the user may change the trained weights during the test/inference phase (e.g., the user may increase or lower one or more of the trained weights). This may give the opportunity to adjust the weights in accordance with a user defined priority.

According to one embodiment, the set of attributes comprises a first subset of attributes and a second subset of attributes. The method further comprises: receiving a first trained data representation learning model comprising a first subset of attribute level trained data representation learning models associated with the first subset of attributes, respectively, wherein the first trained data representation learning model is configured to receive values of the first subset of attributes of a record and to output a feature vector of the record by: inputting the value of each attribute of the first subset of attributes into the associated attribute level trained data representation model of the first subset of attribute level trained data representation learning models, receiving an individual feature vector from each of the attribute level trained data representation models of the first subset of attribute level trained data representation learning models, and combining the individual feature vectors to obtain said feature vector. A second subset of attribute level data representation learning models may be provided for the second subset of attributes, wherein each attribute level data representation learning model of the second subset is configured to generate a feature vector for a respective attribute of the second subset of attributes. A data representation learning model may be created such that it comprises the first trained data representation learning model and the second subset of attribute level data representation learning models. The created data representation learning model may be trained to generate the trained data representation learning model.

The first trained data representation learning model may, for example, be produced centrally by a service provider. The first trained data representation learning model may be provided to multiple users or clients. Each user of the users may use the first trained data representation learning model in accordance with the present subject matter in order to adapt it to his/her needs in an efficient and controlled way. For example, the user may add one or more new pipelines that are associated with new attributes that are specific to the user.

According to one embodiment, the first trained data representation learning model further comprises a first subset of trained weights associated with the first subset of attributes, wherein the combining is performed using the first subset of trained weights (e.g., the individual feature vectors are weighted by respective weights and the weighted individual feature vector are combined). The created data representation learning model further comprises a second subset of trainable weights associated with the second subset of attributes, wherein the trained data representation learning model is configured to output each feature vector of the set of feature vectors by: inputting the value of each attribute of the set of attributes into the associated attribute level trained data representation model of the first and second subsets of attribute level trained data representation learning models, receiving an individual feature vector from each of the attribute level trained data representation models of the first and second subsets of attribute level trained data representation learning models, and combining the individual feature vectors using the respective weights of the first and second subsets of weights to obtain said feature vector. The first subset of weights and second subset of weights may be changed differently during the training.

FIG. 1 depicts an exemplary computer system 100. The computer system 100 may, for example, be configured to perform master data management and/or data warehousing (e.g., the computer system 100 may enable a de-duplication system). The computer system 100 comprises a data integration system 101 and one or more client systems or data sources 105. The client system 105 may comprise a computer system (e.g., as described with reference to FIG. 12). The client systems 105 may communicate with the data integration system 101 via a network connection which comprises, for example, a Wireless Local Area Network (WLAN) connection, a Wide Area Network (WAN) connection, a Local Area Network (LAN) connection, the internet or a combination thereof. The data integration system 101 may control access (e.g., read access, write accesses etc.) to a central repository 103.

A dataset of records 107 stored in the central repository 103 may have values of a set of attributes $a_1 \ldots a_N$ ($N \geq 1$) such as a first name attribute. Although the present example is described in terms of few attributes, more or fewer attributes may be used. The dataset 107 being used in accordance with the present subject matter may comprise at least part of the records of the central repository 103.

Data records stored in the central repository 103 may be received from the client systems 105 and processed (e.g., to transform them into a unified structure) by the data integration system 101 before being stored in the central repository 103. For example, the received records from the client systems 105 may have a structure different from the structure of the stored records of the central repository 103. For example, a client system 105 may be configured to provide records in XML format, JSON format or other formats that enable to associate attributes and corresponding attribute values.

In another example, the data integration system 101 may import data records of the central repository 103 from a client system 105 using one or more Extract-Transform-Load (ETL) batch processes or via HyperText Transport Protocol ("HTTP") communication or via other types of data exchange.

The data integration system 101 may be configured to process the received records using one or more algorithms. The data integration system 101 may, for example, comprise a trained data representation learning model 120. The trained data representation learning model 120 may, for example, be received from a service provider. In another example, the trained data representation learning model 120 may be created at the data integration system 101. The trained data representation learning model 120 is configured to generate a feature vector that represents a given record. The given record has, for example, the set of attributes $a_1 \ldots a_N$. For that, the trained data representation learning model 120 may be configured to receive values of all or part of the attributes $a_1 \ldots a_N$ of the record and to generate the feature vector.

In one example, the trained data representation learning model 120 may comprise multiple attribute level trained data representation learning models 121.1-121.N. Each of the attribute level trained data representation learning models 121.1-121.N may be associated with a respective attribute of the set of attributes $a_1 \ldots a_N$. Each of the attribute level trained data representation learning models 121.1-121.N may be configured to receive a value of a respective attribute $a_1 \ldots a_N$ and to generate a corresponding individual feature vector. The individual feature vectors may be combined to obtain a single feature vector that represents a record. The combination may, for example, be performed using N trained weights $\alpha_1 \ldots \alpha_N$ (not shown in FIG. 1) associated with the set of N attributes $a_1 \ldots a_N$.

Figure 2:
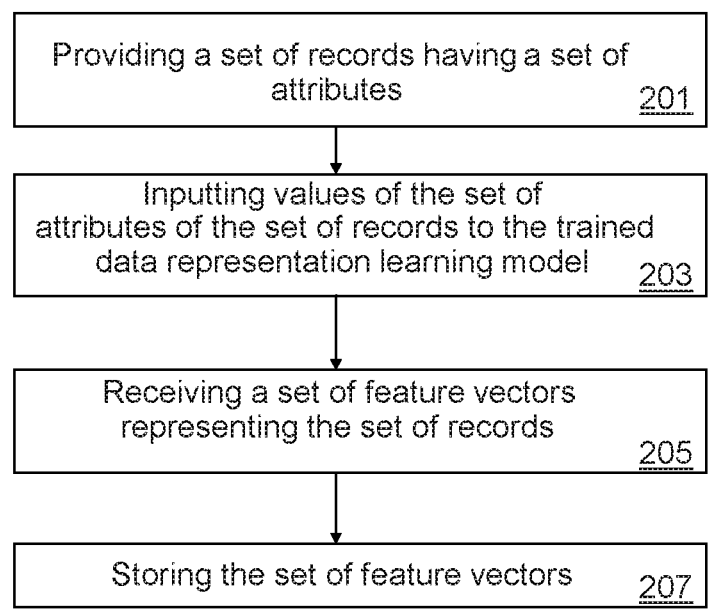
FIG. 2 is a flowchart of a method for storing data in accordance with an example of the present subject matter.

FIG. 2 is a flowchart of a method 200 for storing data in accordance with an example of the present subject matter. For the purpose of explanation, the method described in FIG. 2 may be implemented in the system illustrated in FIG. 1, but is not limited to this implementation. The method of FIG. 2 may, for example, be performed by the data integration system 101.

A set of K records $R_1 \ldots R_K$ may be provided in step 201, where $K \geq 1$. For example, a dataset may comprise the set of K records $R_1 \ldots R_K$. Each record of the set of K records has a set of N attributes, $a_1 \ldots a_N$, $N \geq 1$. In one example, each record of the set of K records may comprise one attribute (i.e., N=1). Using one attribute to generate feature vectors in accordance with the present subject matter may be advantageous as the resulting feature vectors may be used to describe a specific feature of the entities being studied. For example, this may enable clustering or matching records representing students of a same age or a same region etc.

In another example, each record of the set of records may comprise multiple attributes. The set of records may share a subset of one or more attributes of the set of attributes $a_1 \ldots a_N$ and thus may or may not have the same full set of attributes $a_1 \ldots a_N$. Using all attributes may enable describing the entire record (e.g., the feature vectors may provide global representing features). This may be advantageous for detecting duplicate records.

The set of records may, in one example, comprise all the records of an existing database such as the repository 103. This may enable providing feature vectors for all exiting records. In another example, the set of records may comprise one record. This one record may, for example, be a new received record. This may, for example, be advantageous when building a new database.

In step 203, values of the set of attributes of the set of records may be input to the trained data representation learning model 120. An output of the trained data representation learning model 120 may be received in step 205. The output may comprise a set of K feature vectors $F_1 \ldots F_K$ representing the set of records respectively. Steps 203 and 205 may enable an inference of the trained data representation learning model 120. Thus, the two steps 203 and 205 may collectively be referred to as an inference step.

In a first inference example, the trained data representation learning model 120 may be configured to process each record $R_i$ (i=1, 2, ... or K) of the set of records as follows. The values of the set of attributes of the record $R_i$ may be input to the trained data representation learning model 120 at once (e.g., in parallel). The trained data representation learning model 120 may be configured to generate a feature vector for the received values of the record $R_i$. The generated feature vector may represent the record $R_i$. In this example, the trained data representation learning model 120 may, for example, comprise one neural network.

In a second inference example, the trained data representation learning model 120 may be configured to process each record $R_i$ of the set of records as follows. The values of the set of attributes of the record $R_i$ may be input to the trained data representation learning model 120 at once (e.g., in parallel). The trained data representation learning model 120 may be configured to generate an individual feature vector for each received value of the set of attributes. The individual feature vectors may be combined by the trained data representation learning model 120 in order to generate a feature vector that represents the record $R_1$. The individual feature vectors may be generated by attribute level trained data representation models of the trained data representation learning model 120 which are associated with the set of attributes respectively.

In a third inference example, the trained data representation learning model 120 may be configured to process each record $R_t$ of the set of records as follows. The values of the set of attributes of the record $R_t$ may consecutively be input to the trained data representation learning model 120. The trained data representation learning model 120 may be configured to generate an individual feature vector for each received value. The individual feature vectors may be combined by the trained data representation learning model 120 in order to generate a feature vector that represents the record $R_1$. This example may particularly be advantageous in case the set of attributes are of the same type. That is, a single trained data representation learning model (e.g., a single neural network) may validly generate feature vectors for different attributes of the same type. For example, if the set of attributes comprise business and private phone numbers of a person the trained data representation learning model 120 may be used to (consecutively) generate feature vectors for these two attributes. For example, if the entity is a product and the set of attributes are height and width, the trained data representation learning model 120 may be used to (consecutively) generate feature vectors for these two attributes.

The combination of the individual feature vectors may be a concatenation or appending of elements of the individual feature vectors into the feature vector such that the feature vector comprises the elements of the individual feature vectors.

The inference of the trained data representation learning model 120 may result in the set of K feature vectors $F_1 \ldots F_K$ that represent the set of records provided in step 201. Each of the set of feature vectors may be a representation in a d-dimensional mathematical space. The set of feature vectors may be stored in step 207. This may enable an improved storage utilization.

In a first storage example, the set of feature vectors may be stored instead of storing the set of records. This may provide a light weight version of a database of records. This may particularly be advantageous in case the database is used for specific usages that can be satisfied by the feature vectors without a need of the whole records.

In a second storage example, the set of feature vectors may be stored in association with respective set of records. This may particularly be advantageous as the set of feature vectors may not require a large amount of storage resources. This may enable to provide the set of features vectors as metadata of the set of records.

In a third storage example, the set of feature vectors may be clustered into clusters. Cluster information may be determined for each cluster of the clusters. The cluster information may, for example, be a cluster ID or a centroid of the cluster etc. the set of feature vectors may be stored in association with the cluster information of the cluster to which they belong.

Figure 3:
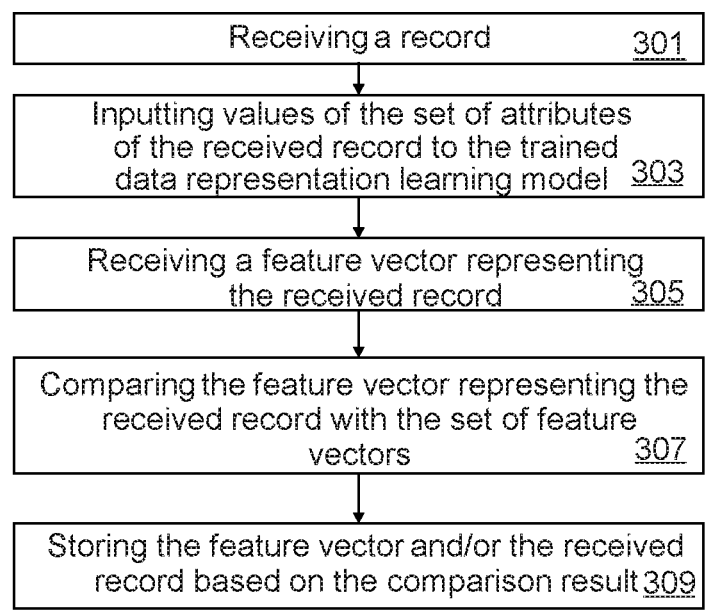
FIG. 3 is a flowchart of a method for matching records in accordance with an example of the present subject matter.

FIG. 3 is a flowchart of a method for matching records in accordance with an example of the present subject matter.

For the purpose of explanation, the method described in FIG. 3 may be implemented in the system illustrated in FIG. 1, but is not limited to this implementation. The method of FIG. 3 may, for example, be performed by the data integration system 101.

A record $R_{K+1}$ may be received in step 301. The received record has a set of N attributes $A_1 \ldots A_N$ that correspond with the set of attributes $a_1 \ldots a_N$ respectively. The number of the attributes of the set of attributes $A_1 \ldots A_N$ is equal to the number of attributes in the set of N attributes used in FIG. 2. However, the set of N attributes $A_1 \ldots A_N$ may or may not be exactly the same as the set of N attributes $a_1 \ldots a_N$. For example, each attribute $A_i$ may be equivalent or exactly the same as $a_t$ (e.g., $a_1$ may be the "first name" attribute and $A_1$ is the "name" attribute or $a_1$ may be a "private phone name" attribute and $A_1$ is a "business phone number" attribute).

The record $R_{K+1}$ may, for example, be received in a data request (e.g., from a client system 105). The data request may, for example, be an update or create operation request. The received record may be a structured or an unstructured record. In case of a received unstructured record (e.g., an article), step 301 may further comprise a processing of the unstructured record to identify attribute values of the set of attributes which are encoded in the received record. In another example, the request may be a matching request for matching the record with the set of records. In both cases, a matching of the record with the set of records may be required (e.g., before storing a received record it may be matched with existing ones to prevent storing duplicate records).

In step 303, values of the set of N attributes $A_1 \ldots A_N$ of the received record $R_{K+1}$ may be input to the trained data representation learning model 120. And an output of the trained data representation learning model 120 may be received in step 305. The output comprises a feature vector $F_{K+1}$ representing the received record $R_{K+1}$.

The feature vector $F_{K+1}$ representing the received record $R_{K+1}$ may be compared in step 307 with at least part of the set of feature vectors $F_1 \ldots F_K$ for determining a matching level of the feature vector $F_{K+1}$ with the set of feature vectors $F_1 \ldots F_K$. The comparison may be performed based on the vector space being defined by the trained data representation learning model. For example, if the training of the data representation learning model tries to find a semantically meaningful space where related patterns (e.g., records of the same entity) are close to each other, the comparison may be performed by calculating a distance between the feature vector $F_{K+1}$ and a feature vector of the set of feature vectors $F_1 \ldots F_K$. The distance may, for example, be Euclidian distance or cosine distance.

In a first comparison example, the feature vector $F_{K+1}$ may be compared with each of the set of feature vectors $F_1 \ldots F_K$. This may result in K similarity levels. The highest one of the K similarity levels may be provided as the matching level of step 307. This may enable an accurate result.

In a second comparison example, the cluster of feature vectors that is closest to the feature vector $F_{K+1}$ may be identified. And the feature vector $F_{K+1}$ may be compared with each feature vector of the identified cluster resulting in multiple similarity levels, wherein the matching level is the highest one of those multiple similarity levels. This may save resources while still providing reliable comparison results.

The feature vector $F_{K+1}$ and/or received record $R_{K+1}$ may be stored in step 309 based on the matching level. For example, if the matching level is smaller than a predefined threshold, the feature vector $F_{K+1}$ and/or received record $R_{K+1}$ may be stored; otherwise the feature vector $F_{K+1}$ and received record $R_{K+1}$ may not be stored.

The method of FIG. 3 may automatically be executed upon receiving the record $R_{K+1}$. In one example, the method of FIG. 3 may be performed in real-time (e.g., the record $R_{K+1}$ may be received as part of a create or update operation).

Figure 4:
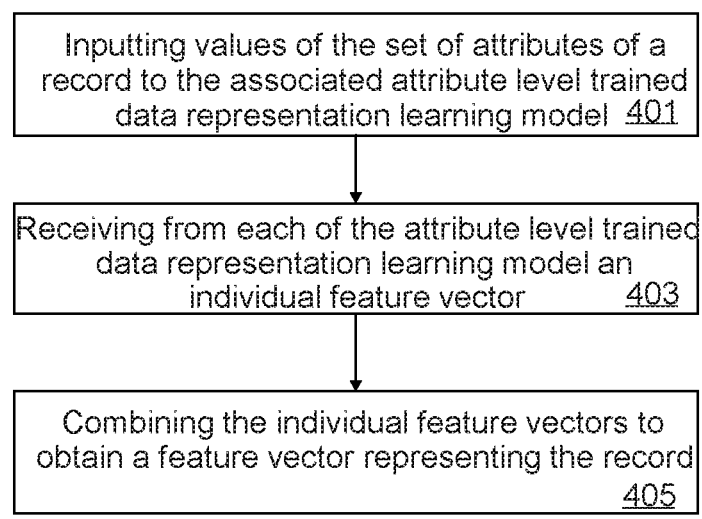
FIG. 4 is a flowchart of an inference method in accordance with an example of the present subject matter.

FIG. 4 is a flowchart of an inference method in accordance with an example of the present subject matter. For the purpose of explanation, the method described in FIG. 4 may be implemented in the system illustrated in FIG. 1, but is not limited to this implementation. The method of FIG. 4 may, for example, be performed by the data integration system 101.

The method of FIG. 4 provides an example implementation of the steps 203 and 205 of FIG. 2. In particular, the method of FIG. 4 enables to generate for each record $R_i$ (i=1, 2, . . . or K) of the set of records $R_1$ . . . $R_K$ a feature vector $F_i$.

In step 401, the value of each attribute $a_j$ (j=1, 2, . . . or N) of the set of N attributes $a_1$ . . . $a_N$ of the record $R_i$ may be input into the associated attribute level trained data representation model 121.j of the attribute level trained data representation models 121.1 through 121.N.

An individual feature vector $v_{ij}$ may be received, in step 403, from each of the attribute level trained data representation models 121.1 through 121.N. This may result in N individual feature vectors per record $R_1$.

The N individual feature vectors $v_{ij}$ of the record $R_i$ may be combined in step 405 to obtain a single feature vector $F_i$ that represents the record $R_1$. The combination may, for example, be performed as follows: $\alpha_1 \odot \alpha_2 * v_{12}$ . . . $\odot \alpha_N * v_{iN}$, where $\alpha_j$ is a trained weight associated with the attribute $a_j$, and A⊙B refers to a concatenation or appending of elements of the two feature vectors A and B into a single vector such that the single vector comprises the elements of A and B. For example, concatenation of vectors [a,b] and [c,d] means making [a,b] and [c,d] into [a, b, c, d].

Figure 5:
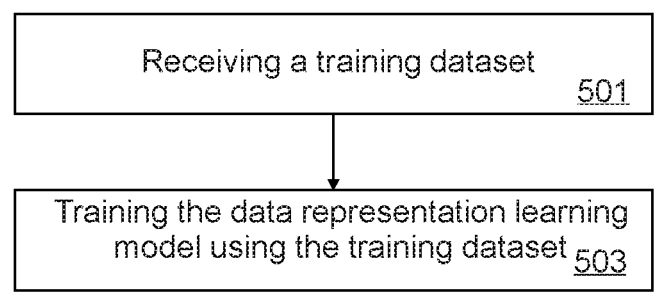
FIG. 5 is a flowchart of a method for training a data representation learning model in accordance with an example of the present subject matter.

FIG. 5 is a flowchart of a method for training a data representation learning model in accordance with an example of the present subject matter.

A training dataset may be received in step 501. The training dataset comprises pairs of records (e.g., pairs of similar records). Each pair of records of the training dataset may be associated with a label indicating whether the pair of records represent the same entity or different entities. Each record of the training dataset has a set of attributes $a_1$ . . . $a_N$. For example, the training set may be obtained from one or more sources (e.g., 105).

A data representation learning model may be trained in step 503 using the training dataset. This may result in the trained data representation learning model. The data representation learning model may, for example, be an autoencoder or a deep neural network.

In a first training example, the training may be performed in order to find a semantically meaningful vector space where feature vectors of related records of the same entity are close to each other. This may enable to preserve, in the vector space, the original pairwise similarities between two records. This may enable to use distances to measure similarities between the feature vectors. In this case, the Twin Neural Network architecture may advantageously be used to train the data representation learning model which is a deep neural network (e.g., the deep neural network may be one of the two networks of the TNN).

In a second training example, the training may be performed in order to find a semantically meaningful vector space where the feature vectors of related records of the same entity can be identified by using a pairwise difference of the individual elements of the two feature vectors that is within a predefined range (e.g., if the difference is outside the range this may indicate that that records are not of the same entity).

Figure 6A:
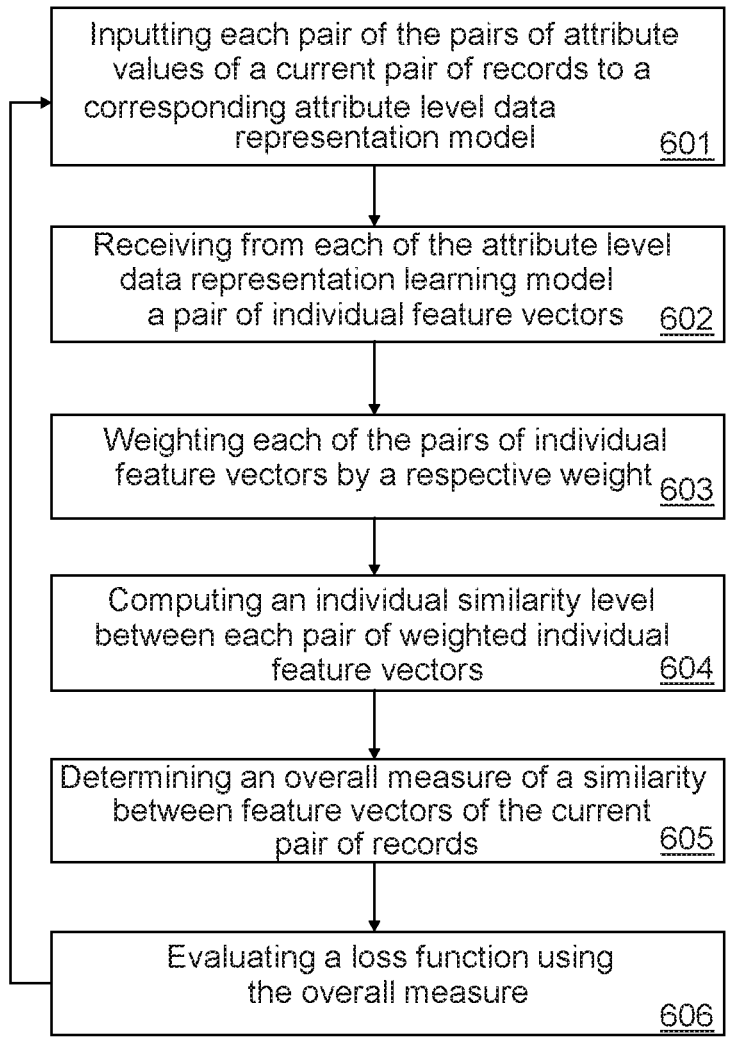
FIG. 6A is a flowchart of a method for training a data representation learning model in accordance with an example of the present subject matter.

FIG. 6A is a flowchart of a method for training a data representation learning model in accordance with an example of the present subject matter. For simplification of the description, the method of FIG. 6A may be described with reference to the example of FIG. 6B.

Figure 6B:
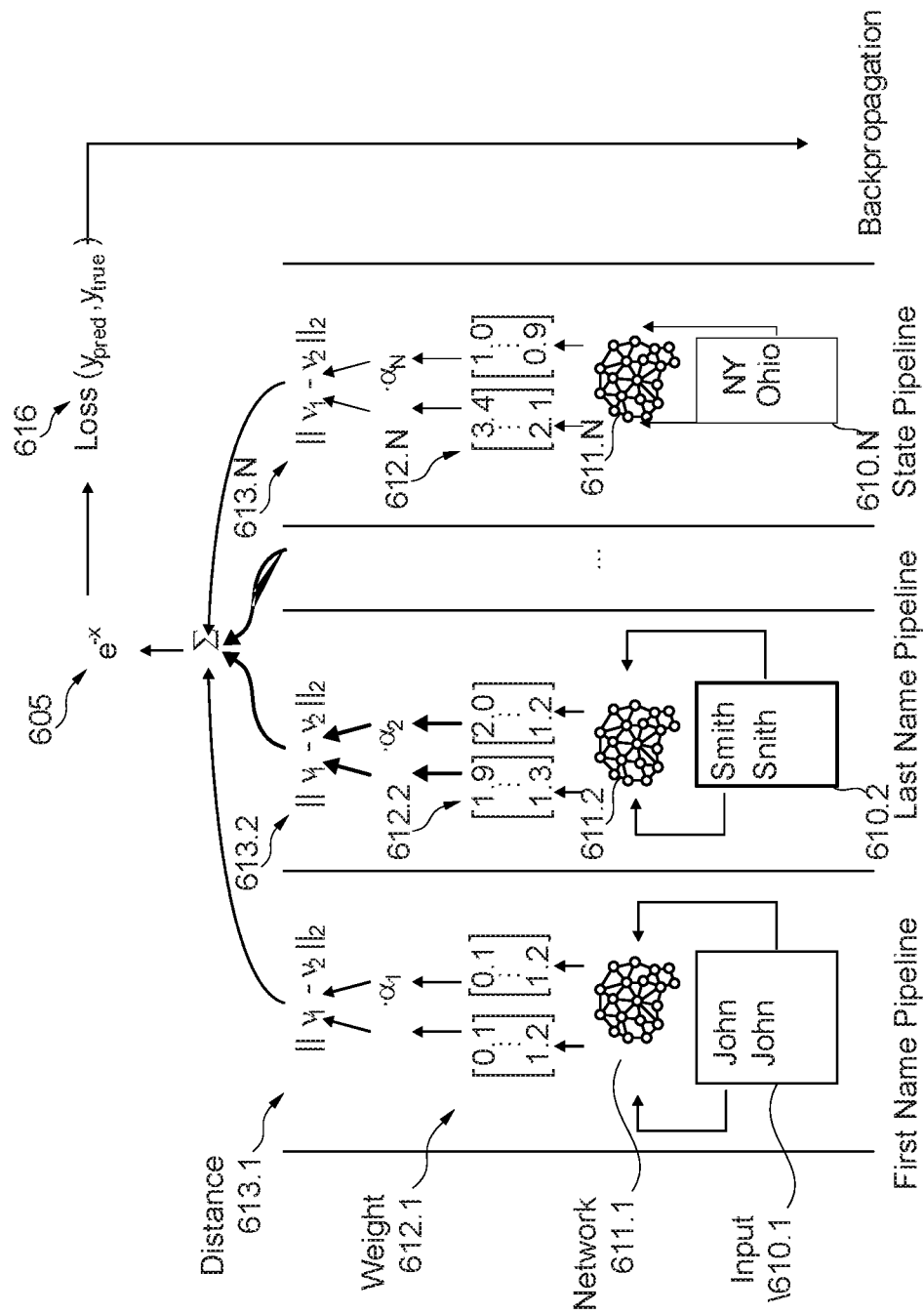
FIG. 6B is a diagram illustrating a training of an example of the data representation learning model.

The data representation learning model may comprise a set of N attribute level data representation models associated with the set of N attributes $a_1$ . . . $a_N$ respectively. Each of the attribute level data representation models may be a neural network system 611.1-611.N as illustrated in FIG. 6B. Each of the neural network systems 611.1-611.N may comprise two neural networks associated with a pair of values of the same attribute respectively. The two networks may share the same weights as with a TNN. In one example, each of the neural network systems 611.1 through 611.N may be a Twin Neural Network. As shown in FIG. 6B, the data representation learning model is structured into pipelines. Each compared attribute (e.g., first name, last name, . . . ) belongs to one pipeline. Each pipeline predicts the similarity of its attribute. These pipelines are then weighted.

The training of the data representation learning model may be performed using a training dataset comprising J labeled pairs of records ($R_1^m$, $R_2^m$), where m varies between 1 and J. FIG. 6B shows an example of a pair of records $R_1^1$={$a_1$="John", $a_2$="Smith", . . . $a_N$="NY"} and $R_2^1$={$a_1$="John", $a_2$="Snith", . . . $a_N$="Ohio"}. Each pair of records has N pairs of attribute values of the set of N attributes $a_1$ . . . $a_N$. Following the example of FIG. 6B, the pair of records ($R_1^1$, $R_2^1$) has the N pairs of attribute values: ("John", "John"), ("Smith", "Snith") . . . ("NY", "Ohio") referenced respectively by reference numerals 610.1 through 610.N.

In step 601, each pair of the N pairs of attribute values 610.1 through 610.N of a current pair of records (e.g., ($R_1^1$, $R_2^1$)) is input to a corresponding attribute level data representation model 611.1 through 611.N. The inputting may, for example, be performed in parallel. This may be advantageous as it may speed up the training process. As shown in FIG. 6B, the pair of values ("John", "John") of attribute $a_1$ is input to the attribute level data representation model 611.1. The pair of values ("Smith", "Snith") of attribute $a_2$ is input to the attribute level trained data representation model 611.2 and so on.

In response to receiving the input, each of the attribute level data representation models 611.1 through 611.N may output, in step 602, a respective pair of individual feature vectors 612.1 through 612.N. For example, the attribute level data representation model 611.1 may output a pair of same individual feature vectors 612.1 because the input values are the same. The attribute level data representation model 611.2 may output a pair of different individual feature vectors 612.2 because the input values are not the same.

Each of the pairs of individual feature vectors 612.1 through 612.N may be weighted in step 603 by a respective weight $\alpha_1$ . . . $\alpha_N$. This may result in a distinct pair of weighted individual feature vectors named $v_1$ . . . and $v_2$ in each pipeline. The weights increase the significance of one pipeline over another. Depending on the customer configuration (number and selection of pipelines) the weights may be adjusted for a given customer.

An individual similarity level 613.1 through 613.N between each pair of weighted individual feature vectors may be computed in step 604. This may, for example, be performed by calculating a distance between the two weighted individual feature vectors of each pair. This is indicated in FIG. 6B, where the output of each pipeline is an individual similarity level that is quantified by a distance $\|v_1-v_2\|_2$.

An overall measure of a similarity between feature vectors of the current pair of records may be determined in step 605. This may, for example, be performed by a combination of the individual weighted similarity levels 613.1 through 613.N.

The overall measure may, for example, be determined using two approaches. In a first approach, the individual vectors v1 may be concatenated for all attributes and individual vectors v2 may be concatenated for all attributes. This may result in concatenated vector V1 and V2. A Euclidean distance (scalar) between the concatenated vectors V1 and V2 may be indicative of the overall measure. In a second approach, an individual distance (scalar) may be computed between individual vector v1 and individual vector v2 for each attribute (e.g., as described in step 604). The sum the individual distances may be indicative of the overall measure.

The concatenation of vectors may comprise appending of elements of the vectors into the concatenated vector such that the concatenated vector comprises the elements of the vectors.

A loss function 616 may be evaluated in step 606 using the overall measure determined in step 605. Steps 601 to 606 may be repeated for each pair of records of at least part of the training dataset with a backpropagation until an optimal value of the loss function is achieved. The term "ex" shown in FIG. 6B may be used to convert the distances into probabilities and may be used as part of the loss function. During the training process, the trainable parameters of the attribute level data representation learning model 611.1 thought 611.N are learned as well as the weights $\alpha_1 \ldots \alpha_N$ for the individual vectors. In case each of the attribute level data representation learning model 611.1 thought 611.N is a neural network, it may comprise groups of network weights (e.g., network weights from the input layer to a first hidden layer, from first to second hidden layer, etc.). Before the training of the attribute level data representation learning model 611.1 thought 611.N, the network weights may be initialized by random numbers or values. The training may be performed in order to search optimization parameters (e.g., for network weights and bias) of the attribute level data representation learning model 611.1 thought 611.N and minimize the classification error or residuals. For example, the training set may be used as input for feeding forward each of the attribute level data representation learning model 611.1 thought 611.N. This may enable to compute data loss by the loss function. The data loss may measure the compatibility between a predicted task and the ground truth label. After getting data loss, the data loss may be minimized by changing the network weights and bias of each of the attribute level data representation learning model 611.1 thought 611.N. This may, for example, be performed by back-propagating the loss into every layers and neuron by gradient descent.

Figure 7A:
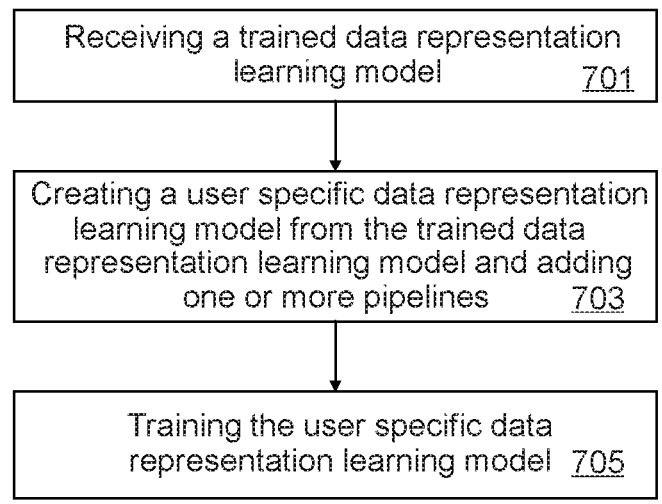
FIG. 7A is a flowchart of a method for training a data representation learning model in accordance with an example of the present subject matter.

FIG. 7A is a flowchart of a method for training a data representation learning model in accordance with an example of the present subject matter. For simplification of the description, the method of FIG. 7A may be described with reference to the example of FIG. 7B.

Figure 7B:
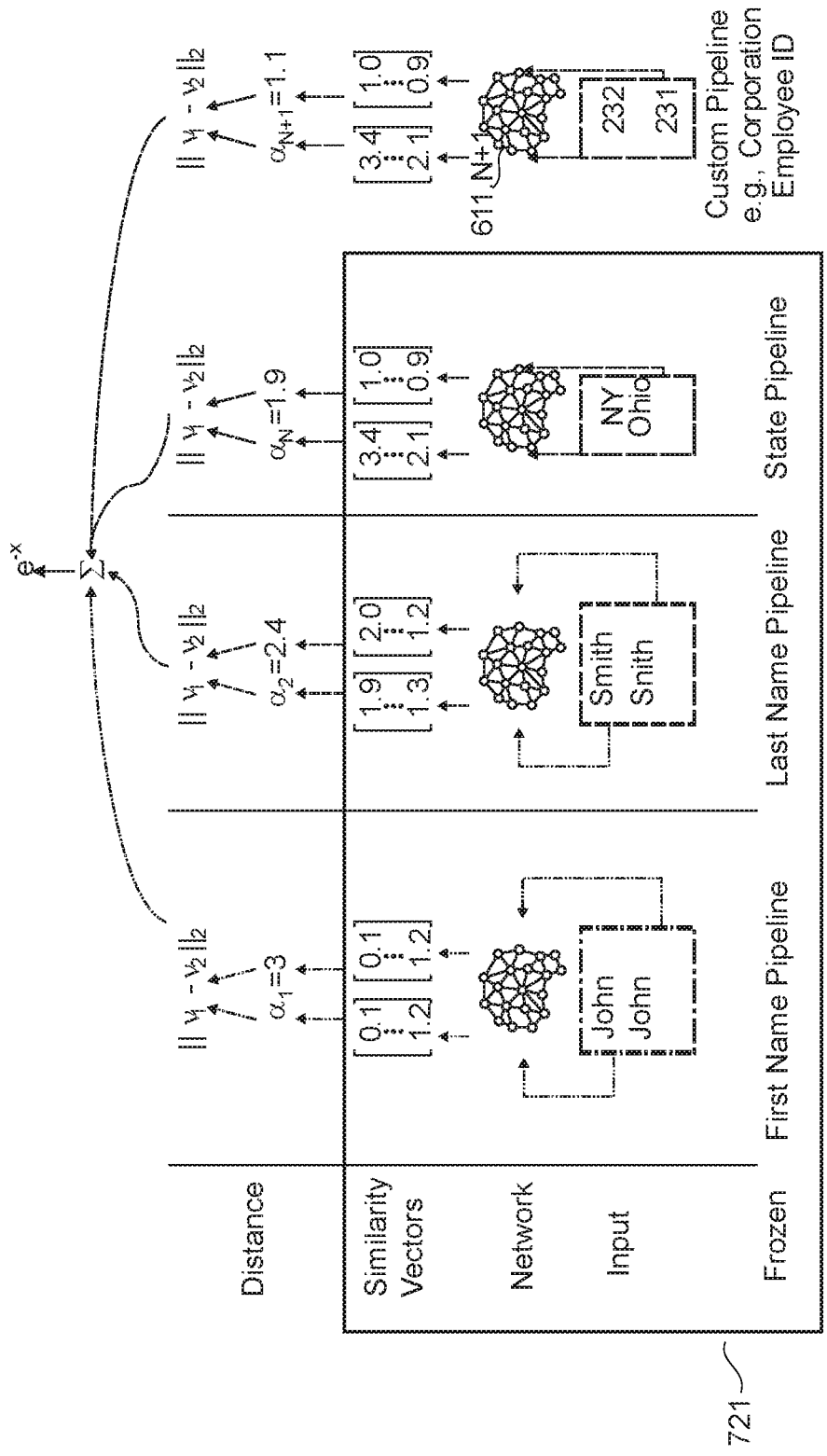
FIG. 7B is a diagram illustrating a training of an example of the data representation learning model.

A trained data representation learning model may be received in step 701. For example, the trained data representation learning model that is resulted from the method of FIG. 6A may be received in step 703. The trained data representation learning model of FIG. 6A may be produced centrally by a service provider and may be used by different clients. In one example, the trained data representation learning model may be used without changes at the client system, or can be updated as described with the present FIGS. 7A-7B. For example, a user may need to use one or more additional attributes which are not used to generate the trained data representation learning model. As shown in FIG. 7B, the user may need to add an additional attribute $a_{N+1}$ which is an Employee ID attribute. For that, a user specific data representation learning model may be created in step 703. The user specific data representation learning model may comprise the trained attribute level trained data representation model 611.1 through 611.N and one additional attribute level trained data representation model 611.N+1 associated with the additional attribute $a_{N+1}$. For example, the user who wants to add a custom employee id to the matching process may add a new pipeline to the structure of the received data representation model. The trained parameters of the trained attribute level trained data representation models 611.1 through 611.N are frozen during the training of the user specific data representation learning model. This may be advantageous as instead of re-training the entire system, the client can add the new pipeline for one additional attribute and just needs to train the network for that one attribute. The received trained weights $a_1 \ldots \alpha_N$ are not frozen and they may be trained again. In addition, an additional weight $\alpha_{N+1}$ is associated with the additional pipeline. Thus, the user specific data representation learning model has trainable parameters of the additional attribute level trained data representation model 611.N+1 and the N+1 trainable weights $\alpha_1 \ldots \alpha_{N+1}$. The trained parameters of the trained attribute level trained data representation model 611.1 through 611.N are frozen and need not to be changed during the training of the user specific data representation learning model.

In step 705, the user specific data representation learning model may be trained using a training set. The training set comprises pairs of records and associated labels, wherein each record of the training set has the N+1 attributes $a_1 \ldots a_{N+1}$. The training of the user specific data representation learning model may be performed as described with reference to FIG. 6A. The parameters of the attribute level trained data representation model 611.1 through 611.N are fixed and not changed during the training.

Figure 8:
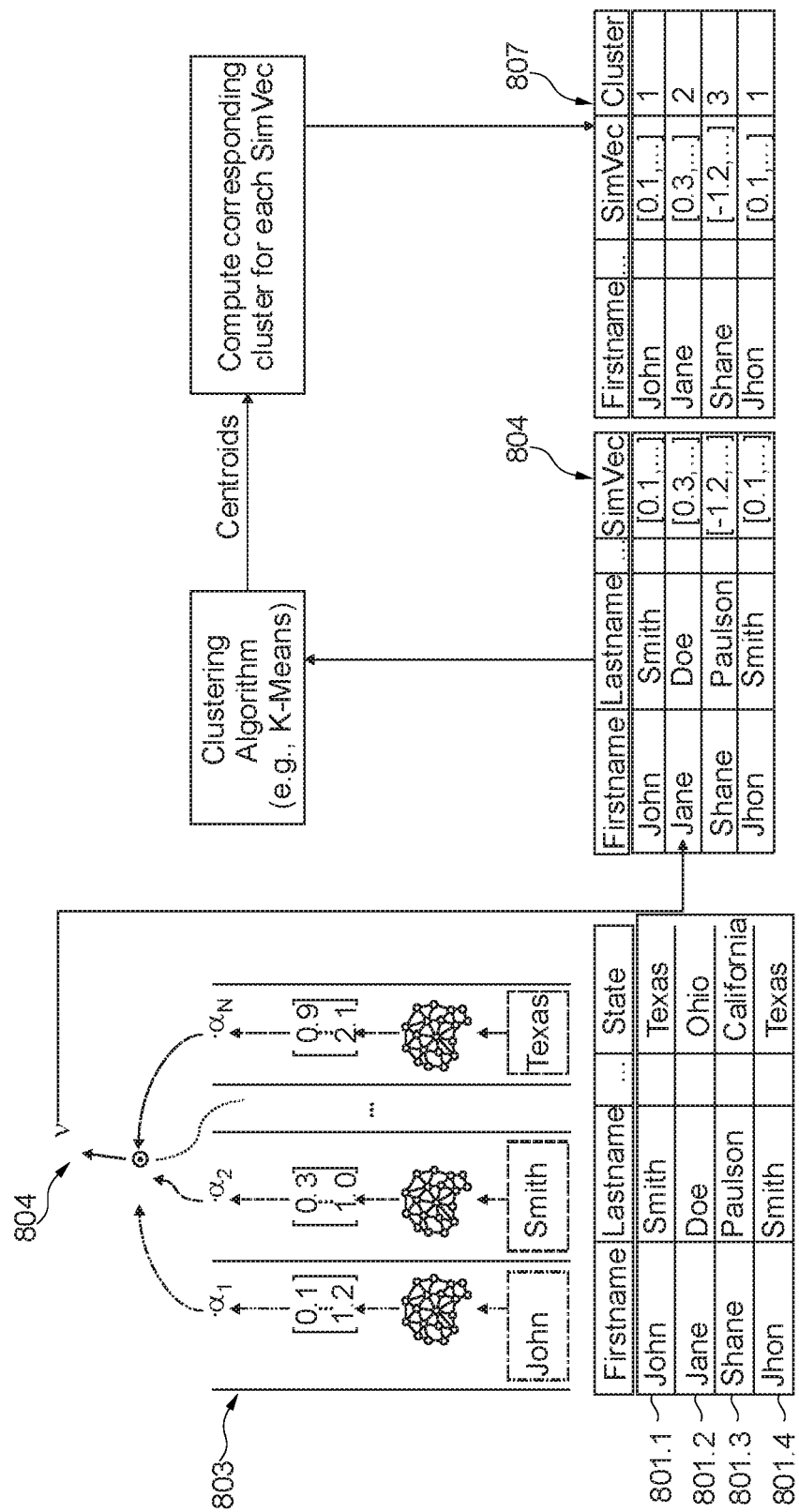
FIG. 8 is a diagram illustrating a method for storing feature vectors in accordance with an example of the present subject matter.

FIG. 8 is a diagram illustrating a method for storing feature vectors in accordance with an example of the present subject matter.

A set of records 801.1 through 801.4 may be provided. Each of the records 801.1 through 801.4 has the set of attributes $a_1 \ldots a_N$ that are used to generate the trained data representation learning model 803 (e.g., as described with reference to FIG. 6A).

The values of the set of attributes $a_1 \ldots a_N$ of each record of the records 801.1 through 801.4 may be input to the trained data representation learning model 803 in order to generate the feature vector 804 (named SimVec or similarity vector) that represents the record. The values of the set of attributes $a_1 \ldots a_N$ are input to the respective attribute level trained machine learning model of the trained data representation learning model 803. For each input record, individual feature vectors are generated using the individual pipelines. The individual feature vectors are weighted using the trained weights $\alpha_1 \ldots \alpha_N$. The weighted individual feature vectors are concatenated or combined to create the feature vector 804. The resulting feature vectors 804 of the records 801.1 through 801.4 may be clustered using a clustering algorithm such as K-means. The centroid of each cluster of the formed clusters may, for example, further be determined. The feature vectors 804 of the records 801.1 through 801.4 may be stored in association with cluster information 807 indicative of the cluster to which the feature vector belongs. This cluster information of a cluster may, for example, be a cluster index and/or the computed centroid of the cluster. The stored feature vectors may, for example, be used as described with reference to FIG. 9. The clustering algorithm may be a trained algorithm. The clustering algorithm may be trained using feature vectors representing training records, wherein the feature vectors are generated by the trained data representation learning model in accordance with the present subject matter.

Figure 9:
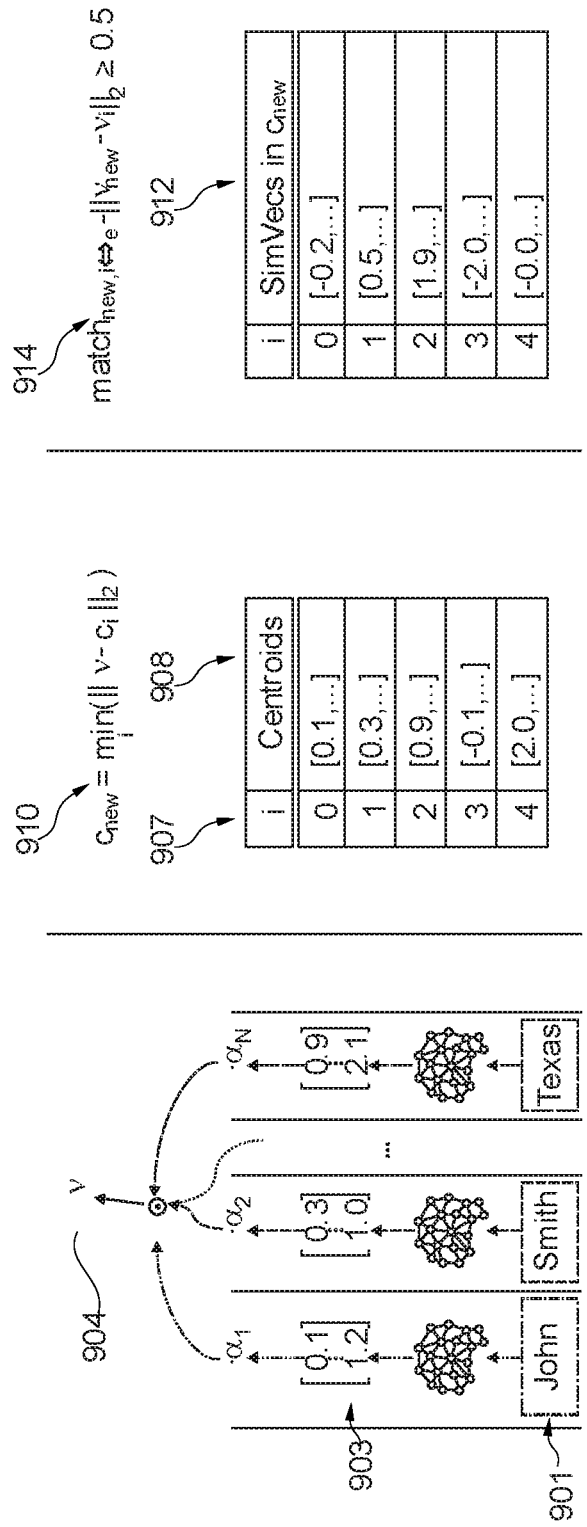
FIG. 9 is a diagram illustrating a prediction process in accordance with an example of the present subject matter.

FIG. 9 is a diagram illustrating a prediction process in accordance with an example of the present subject matter. For that, the trained data representation learning model 903 (e.g., as described with reference to FIG. 6A) may be provided. A record 901 with the set of attributes $a_1 \ldots a_N$ that are used to generate the trained data representation learning model 903 may be provided. The values of the set of attributes $a_1 \ldots a_N$ of the record 901 may be input to the trained data representation learning model 903 in order to generate the feature vector 904 that represents the record 901. The values of the set of attributes $a_1 \ldots a_N$ are input to the respective attribute level trained machine learning model of the trained data representation learning model 903. Individual feature vectors are generated using the individual pipelines. The individual feature vectors are weighted using the trained weights $\alpha_1 \ldots \alpha_N$. The weighted individual feature vectors are concatenated or combined to create the feature vector 904 (or similarity vector). The feature vector 904 is compared with the centroids 908 of the clusters 907 (e.g., created with reference to FIG. 8), in order to find a closest cluster. For that, a distance 910 between the feature vector 904 and each of the centroids 908 may be computed and the cluster associated with the smallest computed distance may be the cluster associated with the feature vector 904. After identifying the cluster associated with the feature vector 904, a possible match between the feature vector 904 and each feature vector 912 of the cluster associated with the feature vector 904 may be determined. For that, a matching metric 914 between the feature vector 904 and each of the feature vectors 912 may be computed. This may result in a matching level between the feature vector and the stored feature vectors. The matching level may, for example, be the smallest computed value of the metric 914. If the matching level is higher than a threshold this may indicate that the record 901 has a matching stored record or duplicate record. A deduplication system built on this invention may then merge the records because they represent the same entity. The merging of records is an operation which can be implemented in different ways. For example, the merging of two records may comprise creating a golden record as a replacement of the similar looking records which have been found to be duplicates to each other. This is known as data fusion or physical collapse with either record or attribute level survivorship. If the matching level is smaller than or equal to the threshold, this indicates that the record 901 does not match any record of the cluster and may thus be stored.

Figure 10:
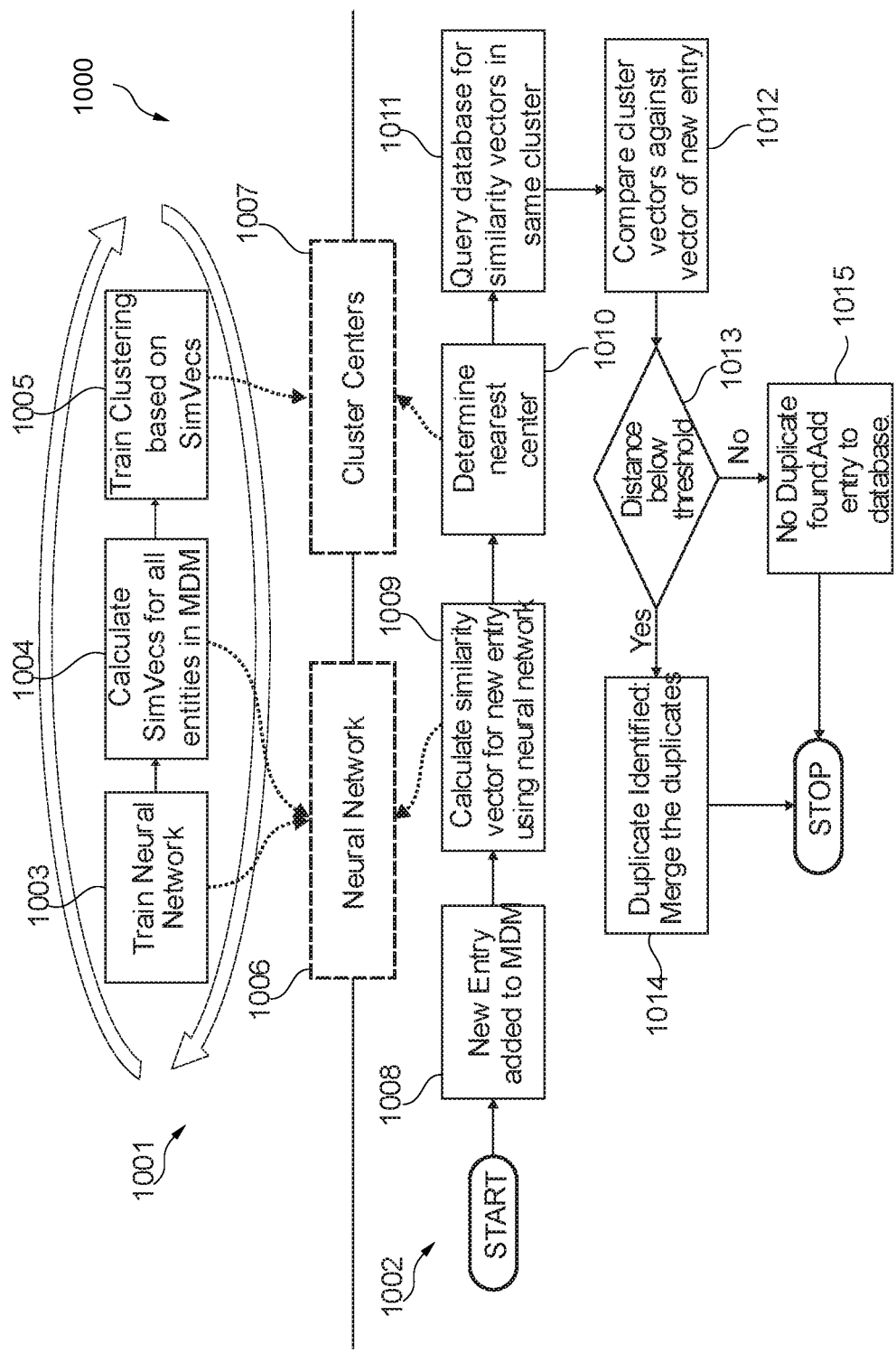
FIG. 10 is a flowchart of a method for matching records in accordance with an example of the present subject matter.

FIG. 10 is a flowchart of a method 1000 for matching records in accordance with an example of the present subject matter. The method 1000 comprises a machine learning phase 1001 and an application phase 1002.

A neural network system may be trained (1003) such that the trained neural network system may generate feature vectors (SimVecs) that represent data records. The trained neural network system 1006 may be used to generate (1004) feature vectors of all records of an MDM database. A clustering algorithm may be trained (1005) on the generated feature vectors. This may result in cluster centroids 1007 of clusters of the generated feature vectors. Steps 1003, 1004, 1005 and 1007 are part of the machine learning phase 1001.

During the application phase 1002, and after the feature vectors have been generated for all records of the MDM database, a request to add a new record may be received (1008). The trained neural network system 1006 may be used to generate a feature vector (1009) for the received record. The cluster centroids 1007 may be used to determine (1010) the nearest centroid to the generated feature vector of the received record. The MDM database may be queried (1011) for the generated feature vectors that belong to the cluster having that nearest centroid. The queried feature vectors may be compared (1012) with the generated feature vector of the received record. The comparison may be performed by computing a distance between the compared feature vectors. In case (1013) the distance between two compared feature vectors is below a threshold, this indicates that they are duplicates and corresponding records may be merged (1014). In case (1013) the distance between all compared two feature vectors is not below the threshold, this indicates that they are not duplicates and the received record may be stored in the MDM database.

Figure 11:
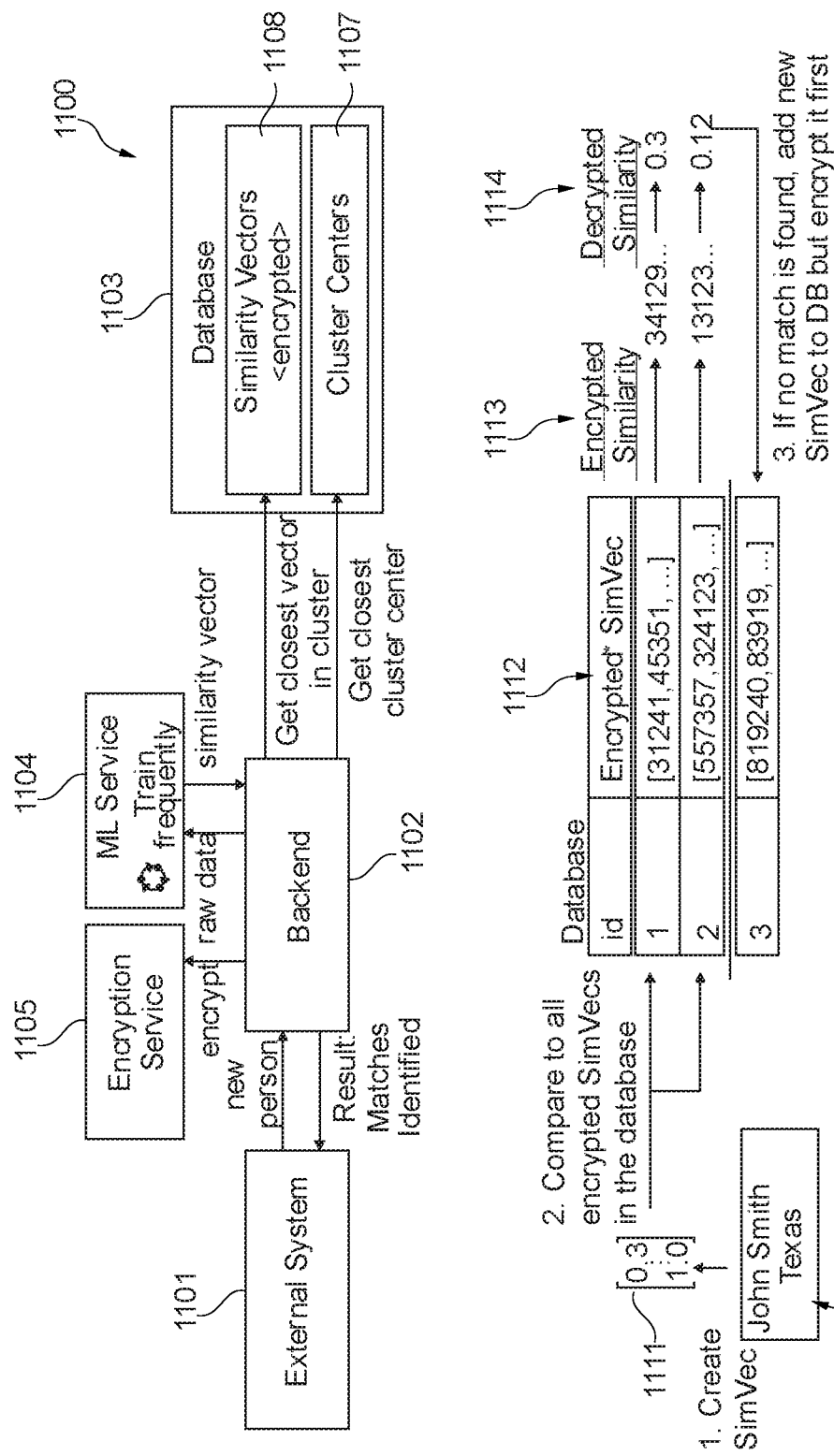
FIG. 11 is a diagram of a system for matching records in accordance with an example of the present subject matter.

FIG. 11 is a diagram of a system 1100 for matching records in accordance with an example of the present disclosure. An external system (e.g., a customer's database) 1101 may provide MDM with new record entries (e.g., person, organization). These entries are sent to the MDM backend 1102, which sends a request to the ML service 1104 to generate a similarity vector 1111 from the new entry 1110. This newly created vector 1111 may then be used to find its corresponding cluster using already trained clusters 1108 which are stored encrypted inside a database 1103. Cluster centers 1107 which are stored in the database 1103 may be used to find the corresponding cluster. Having obtained a cluster, the backend 1102 may then query all existing vectors inside that cluster and find possible matches with received entry. However, the feature vectors stored in the database 1103 may be encrypted using a homomorphic encryption such as Paillier encryption. Thus, in order to find a match between the feature vector 1111 of the received entry 1110 and the encrypted feature vectors 1112 of the cluster, the feature vector 1111 of the received entry 1110 is not encrypted and can be compared in unencrypted format with the encrypted feature vectors 1112. For that, the Euclidian distance may be reformulated such that one can benefit of the homomorphic encryption. The reformulated Euclidian distance may be as follows:

$$\sum_{i=0}^{n-1} (\vec{x}_{1,i} - \vec{x}_{2,i})^2 = \sum_{i=0}^{n-1} (\vec{x}_{1,i})^2 + \sum_{i=0}^{n-1} (-2\vec{x}_{1,i}\vec{x}_{2,i}) + \sum_{i=0}^{n-1} (\vec{x}_{2,i})^2.$$

The distance is defined as the sum of three terms $L1 = \sum_{i=0}^{n-1}(\vec{x}_{1,i})^2$, $L2 = \sum_{i=0}^{n-1}(-2\vec{x}_{1,i}\vec{x}_{2,i})$ and $L3 =$ $\Sigma_{i=0}^{n-1}(\vec{x}_{2,i})^2$. L1 and L3 can easily be computed and encrypted when the SimVecs are firstly created. L2 can be computed using Paillier's homomorphic properties, only requiring one of the two vectors to be in plaintext, while the other can stay encrypted.

The reformulated distance may be computed between the feature vector 1111 and each encrypted feature vector 1112 of the cluster. This may result in encrypted similarities 1113. The encrypted similarities may be decrypted to obtain respective decrypted similarities 1114. Each of the decrypted similarities 1114 may be compared with a threshold in order to determine whether there is a match between the new entry 1110 and any stored entry of the database 1103. If no match is found, the generated feature vector 1111 of the new entry may first be encrypted and then stored in the database 1103.

Figure 12:
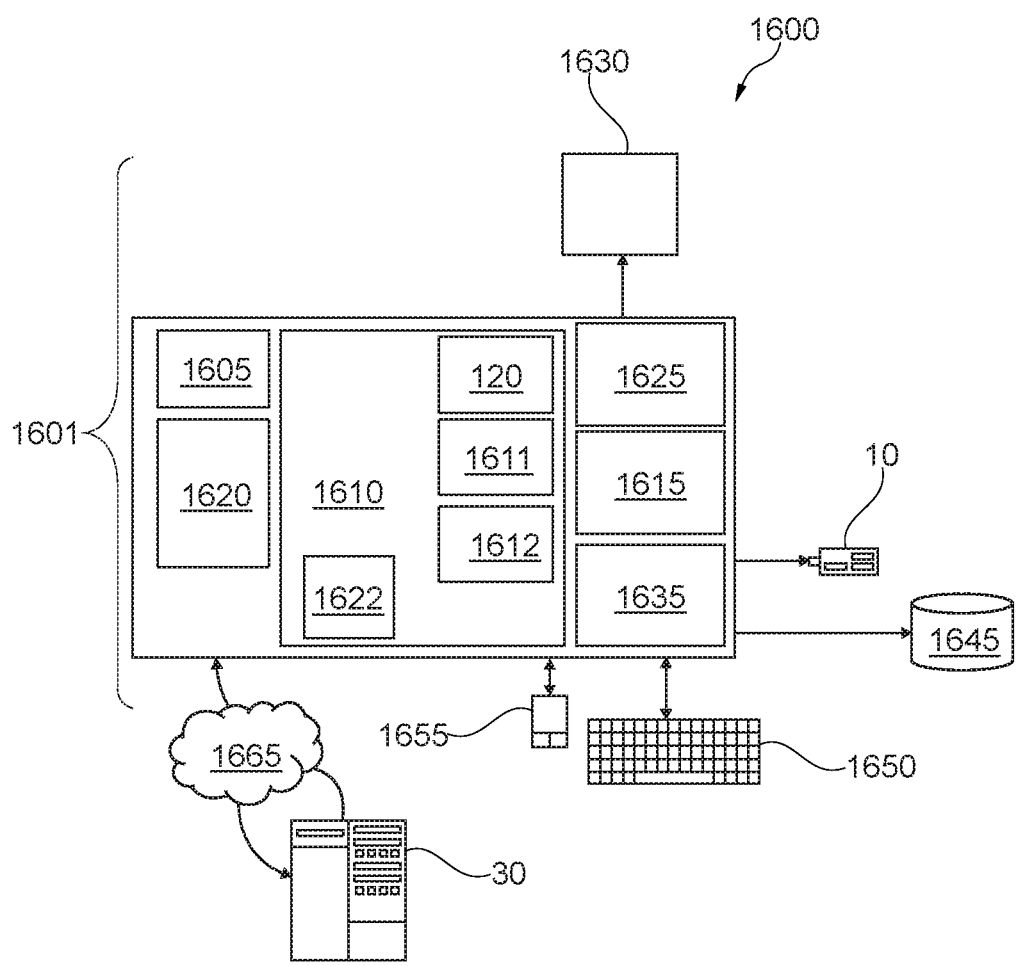
FIG. 12 represents a computerized system, suited for implementing one or more method steps as involved in the present disclosure.

FIG. 12 represents a general computerized system 1600 (e.g., the data integration system) suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 1612 (including firmware 1622), hardware (processor) 1605, or a combination thereof. In exemplary embodiments, the methods described herein are implemented in software, as an executable program, and is executed by a special or general-purpose digital computer, such as a personal computer, workstation, minicomputer, or mainframe computer. The most general system 1600 therefore includes a general-purpose computer 1601.

In exemplary embodiments, in terms of hardware architecture, as shown in FIG. 12, the computer 1601 includes a processor 1605, memory (main memory) 1610 coupled to a memory controller 1615, and one or more input and/or output (I/O) devices (or peripherals) 10, 1645 that are communicatively coupled via a local input/output controller 1635. The input/output controller 1635 can be, but is not limited to, one or more buses or other wired or wireless connections, as is known in the art. The input/output controller 1635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 1645 may generally include any generalized cryptographic card or smart card known in the art.

The processor 1605 is a hardware device for executing software, particularly that stored in memory 1610. The processor 1605 can be any custom made or commercially available processor, a central processing unit (CPU), an auxiliary processor among several processors associated with the computer 1601, a semiconductor based microprocessor (in the form of a microchip or chip set), a macroprocessor, or generally any device for executing software instructions.

The memory 1610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 1610 can have a distributed architecture, where various components are situated remote from one another, but can be accessed by the processor 1605.

The software in memory 1610 may include one or more separate programs, each of which comprises an ordered listing of executable instructions for implementing logical functions, notably functions involved in embodiments of this invention. In the example of FIG. 12, software in the memory 1610 includes instructions 1612 (e.g., instructions to manage databases such as a database management system).

The software in memory 1610 shall also typically include a suitable operating system (OS) 1611. The OS 1611 essentially controls the execution of other computer programs, such as possibly software 1612 for implementing methods as described herein.

The methods described herein may be in the form of a source program 1612, executable program 1612 (object code), script, or any other entity comprising a set of instructions 1612 to be performed. When a source program, then the program needs to be translated via a compiler, assembler, interpreter, or the like, which may or may not be included within the memory 1610, so as to operate properly in connection with the OS 1611. Furthermore, the methods can be written as an object-oriented programming language, which has classes of data and methods, or a procedure programming language, which has routines, subroutines, and/or functions.

In exemplary embodiments, a conventional keyboard 1650 and mouse 1655 can be coupled to the input/output controller 1635. Other output devices such as the I/O devices 1645 may include input devices, for example but not limited to a printer, a scanner, microphone, and the like. Finally, the I/O devices 10, 1645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 1645 can be any generalized cryptographic card or smart card known in the art. The system 1600 can further include a display controller 1625 coupled to a display 1630. In exemplary embodiments, the system 1600 can further include a network interface for coupling to a network 1665. The network 1665 can be an IP-based network for communication between the computer 1601 and any external server, client and the like via a broadband connection. The network 1665 transmits and receives data between the computer 1601 and external systems 30, which can be involved to perform part, or all of the steps of the methods discussed herein. In exemplary embodiments, network 1665 can be a managed IP network administered by a service provider. The network 1665 may be implemented in a wireless fashion (e.g., using wireless protocols and technologies, such as WiFi, WiMax, etc.). The network 1665 can also be a packet-switched network such as a local area network, wide area network, metropolitan area network, Internet network, or other similar type of network environment. The network 1665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1601 is a PC, workstation, intelligent device or the like, the software in the memory 1610 may further include a basic input output system (BIOS) 1622. The BIOS is a set of essential software routines that initialize and test hardware at startup, start the OS 1611, and support the transfer of data among the hardware devices. The BIOS is stored in ROM so that the BIOS can be executed when the computer 1601 is activated.

When the computer 1601 is in operation, the processor 1605 is configured to execute software 1612 stored within the memory 1610, to communicate data to and from the memory 1610, and to generally control operations of the computer 1601 pursuant to the software. The methods described herein and the OS 1611, in whole or in part, but typically the latter, are read by the processor 1605, possibly buffered within the processor 1605, and then executed.

When the systems and methods described herein are implemented in software 1612, as is shown in FIG. 12, the methods can be stored on any computer readable medium, such as storage 1620, for use by or in connection with any computer related system or method. The storage 1620 may comprise a disk storage such as HDD storage.

The present subject matter comprises the following clauses.

Clause 1: A computer implemented method comprising:
providing a set of one or more records, each record of the set of records having a set of one or more attributes;
inputting values of the set of attributes of the set of records to a trained data representation learning model, thereby receiving, as an output of the trained data representation model, a set of feature vectors representing the set of records respectively;
storing the set of feature vectors.

Clause 2: The method of clause 1, further comprising:
receiving a further record having the set of attributes;
inputting values of the set of attributes of the received further record to the trained data representation learning model, thereby obtaining a feature vector of the received further record from the trained data representation learning model;
comparing the obtained feature vector with at least part of the set of feature vectors for determining a matching level of the obtained feature vector with the set of feature vectors;
storing the obtained feature vector and/or received further record based on the matching level.

Clause 3: The method of clause 1 or 2, the storing of the set of feature vectors comprising clustering the set of feature vectors into clusters and associating each of the stored feature vectors with cluster information indicative of the corresponding cluster.

Clause 4: The method of clause 1 or 2, the storing of the set of feature vectors comprising clustering the set of feature vectors into clusters of feature vectors, the method further comprising determining a distance between the obtained feature vector and a vector representing each cluster of the clusters, wherein the at least part of the set of feature vectors comprises the cluster represented by the vector with a closest distance to the obtained feature vector.

Clause 5: The method of any of preceding clauses 2 to 4, being performed in real time, wherein the record is received as part of a create or update operation.

Clause 6: The method of any of preceding clauses 1 to 5, wherein the outputting of each feature vector of the set of feature vectors comprises generating for each attribute of the set of attributes an individual feature vector and combining the individual features vectors to obtain said feature vector.

Clause 7: The method of any of preceding clauses 1 to 6, the trained data representation learning model being configured to process the input values in parallel.

Clause 8: The method of any of preceding clauses 1 to 7, the trained data representation learning model comprising a set of attribute level trained data representation models, wherein each of the set of attribute level trained data representation models is associated with a respective attribute of the set of attributes, wherein the output of each feature vector of the set of feature vectors comprises:
inputting the value of each attribute of the set of attributes into the associated attribute level trained data representation model;
in response to the inputting, receiving an individual feature vector from each of the attribute level trained data representation models; and
combining the individual feature vectors to obtain said feature vector.

Clause 9: The method of clause 8, the trained data representation learning model further comprising a set of trained weights, each weight of the set of weights being associated with a respective attribute of the set of attributes, wherein the combining comprises weighting each of the individual feature vectors with a respective trained weight of the set of trained weights.

Clause 10: The method of clause 8 or 9, each of the attribute level trained data representation models being a neural network.

Clause 11: The method of any of preceding clauses 8 to 10, the trained data representation learning model resulting from a training for optimizing a loss function, the loss function being a measure of a similarity between feature vectors of pairs of records, the measure of similarity being a combination of individual similarities, each individual similarity of the individual similarities indicating a similarity of the two individual feature vectors generated for the same attribute in the pair of records.

Clause 12: The method of any of preceding clauses 1 to 11, the trained data representation learning model being trained for optimizing a loss function, the loss function being a measure of a similarity between feature vectors of a pair of records.

Clause 13: The method of any of preceding clauses 1 to 12, the trained data representation learning model comprising at least one neural network that is trained in accordance with a Twin Neural Network architecture.

Clause 14: The method of clause 13, the trained data representation learning model comprising one trained neural network per attribute of the set of attributes, wherein the output of each feature vector of the set of feature vectors comprises:
inputting the value of each attribute of the set of attributes into the associated trained neural network;
in response to the inputting, receiving an individual feature vector from each of the trained neural networks; and
combining the individual feature vectors to obtain said feature vector.

Clause 15: The method of any of preceding clauses 1 to 14, further comprising:
receiving a training dataset comprising pairs of similar records having the set of attributes;
training a data representation learning model using the training dataset, thereby generating the trained data representation learning model.

Clause 16: The method of clause 15, the data representation learning model comprising a set of attribute level trained data representation models associated with the set of attributes respectively, the training of the data representation learning model comprising for each pair of similar records:

for each attribute of the set of attributes:
   inputting a pair of values of the attribute in the pair of records to the corresponding attribute level trained data representation model, thereby obtaining a pair of individual feature vectors;
   calculating an individual similarity level between the pair of individual feature vectors;
   weighting the individual similarity level with a trainable weight of the attribute;
determining a measure of a similarity between feature vectors of the pair of records as a combination of the individual weighted similarity levels;
evaluating a loss function, for the training, using the measure.

Clause 17: The method of any of preceding clauses 1 to 16, the set of attributes comprising a first subset of attributes and a second subset of attributes, the method further comprising:
   receiving a first trained data representation learning model comprising a first subset of attribute level trained data representation learning models associated with the first subset of attributes respectively, wherein the first trained data representation learning model is configured to receive values of the first subset of attributes of a record and to output a feature vector of the record by: inputting the value of each attribute of the first subset of attributes into the associated attribute level trained data representation model of the first subset of attribute level trained data representation learning models; receiving an individual feature vector from each of the attribute level trained data representation models of the first subset of attribute level trained data representation learning models; and combining the individual feature vectors to obtain said feature vector;
   providing for the second subset of attributes a second subset of attribute level data representation learning models, each attribute level data representation learning model of the second subset being configured to generate a feature vector for a respective attribute of the second subset of attributes;
   creating a data representation learning model comprising the first trained data representation learning model and the second subset of attribute level data representation learning models;
   training the data representation learning model, thereby generating the trained data representation learning model.

Clause 18: The method of clause 17, the first trained data representation learning model further comprising a first subset of trained weights associated with the first subset of attributes, wherein the combining is performed using the first subset of trained weights, the created data representation learning model further comprising a second subset of trainable weights associated with the second subset of attributes, wherein the trained data representation learning model is configured to output a feature vector of the set of feature vectors by:
   inputting the value of each attribute of the set of attributes into the associated attribute level trained data representation model of the first and second subsets of attribute level trained data representation learning models;
   in response to the inputting, receiving an individual feature vector from each of the attribute level trained data representation models of the first and second subsets of attribute level trained data representation learning models; and combining the individual feature vectors using the respective weights of the first and second subsets of weights to obtain said feature vector.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   providing a set of records, each record of the set of records having a set of attributes, wherein the set of attributes include a first subset of attributes and a second set of attributes;
   receiving a first trained data representation learning model comprising a first subset of attribute level trained data representation learning models associated with the first subset of attributes respectively, wherein the first trained data representation learning model is configured to receive values of the first subset of attributes of a record and to output a feature vector of the record by:
      inputting a value of each attribute of the first subset of attributes into the associated attribute level trained data representation model of the first subset of attribute level trained data representation learning models;
      receiving an individual feature vector from each of the attribute level trained data representation models of the first subset of attribute level trained data representation learning models; and
      combining the individual feature vectors to obtain each feature vector;
   providing for the second subset of attributes a second subset of attribute level data representation learning models, each attribute level data representation learning model of the second subset being configured to generate a feature vector for a respective attribute of the second subset of attributes;
   creating a data representation learning model comprising the first trained data representation learning model and the second subset of attribute level data representation learning models;
   training the data representation learning model, thereby generating a trained data representation learning model;
   inputting values of the set of attributes of the set of records to the trained data representation learning model;
   receiving, as an output of the trained data learning representation model, a set of feature vectors representing the set of records respectively; and
   accessing a first record from the set of records based on the set of feature vectors.

2. The method of claim 1, further comprising:
   receiving a further record having the set of attributes;
   inputting values of the set of attributes of the received further record to the trained data representation learning model, thereby obtaining a feature vector of the received further record from the trained data representation learning model;
   comparing the obtained feature vector with at least part of the set of feature vectors for determining a matching level of the obtained feature vector with the set of feature vectors; and
   storing the obtained feature vector and/or received further record based on the matching level.

3. The method of claim 1, further comprising:
   clustering the set of feature vectors into clusters of feature vectors;
   associating each of the set of feature vectors with cluster information indicative of a corresponding cluster from the clusters of feature vectors;
   storing the cluster of feature vectors.

4. The method of claim 2, further comprising:
clustering the set of feature vectors into clusters of feature vectors;
storing the clusters of feature vectors; and
determining a distance between the obtained feature vector and a vector representing each cluster of the clusters of feature vectors, wherein the at least part of the set of feature vectors comprises the cluster represented by the vector with a closest distance to the obtained feature vector.

5. The method of claim 2, wherein:
the method is performed in real time; and
the record is received as part of a create or update operation.

6. The method of claim 1, wherein the trained data representation learning model being configured to process the input values in parallel.

7. The method of claim 1, wherein the trained data representation learning model further comprising a set of trained weights, each weight of the set of weights being associated with a respective attribute of the set of attributes, wherein the combining comprises weighting each of the individual feature vectors with a respective trained weight of the set of trained weights.

8. The method of claim 1, wherein each of the attribute level trained data representation models being a neural network.

9. The method of claim 1, wherein the trained data representation learning model being trained for optimizing a loss function, the loss function being a measure of a similarity between feature vectors of pairs of records, the measure of similarity being a combination of individual similarities, each individual similarity of the individual similarities indicating a similarity of two individual feature vectors generated for the same attribute in the pair of records.

10. The method of claim 1, wherein the trained data representation learning model being trained for optimizing a loss function, the loss function being a measure of a similarity between feature vectors of a pair of records.

11. The method of claim 1, wherein the trained data representation learning model comprising at least one neural network that is trained in accordance with a Twin Neural Network architecture.

12. The method of claim 1, wherein the data representation learning model comprising a set of attribute level data representation models associated with the set of attributes respectively, the training of the data representation learning model comprising, for each pair of records:
for each attribute of the set of attributes:
inputting a pair of values of the attribute in the pair of records to the corresponding attribute level data representation model, thereby obtaining a pair of individual feature vectors;
calculating an individual similarity level between the pair of individual feature vectors; and
weighting the individual similarity level with a trainable weight of the attribute;
determining a measure of a similarity between feature vectors of the pair of records as a combination of the individual weighted similarity levels; and
evaluating a loss function, for the training, using the measure.

13. The method of claim 1, wherein the first trained data representation learning model further comprising a first subset of trained weights associated with the first subset of attributes, wherein the combining is performed using the first subset of trained weights, the created data representation learning model further comprising a second subset of trainable weights associated with the second subset of attributes wherein the trained data representation learning model is configured to output a feature vector of the set of feature vectors by:
inputting the value of each attribute of the set of attributes into the associated attribute level trained data representation model of the first and second subsets of attribute level trained data representation learning models;
in response to the inputting, receiving an individual feature vector from each of the attribute level trained data representation models of the first and second subsets of attribute level trained data representation learning models; and
combining the individual feature vectors using the respective weights of the first and second subsets of weights to obtain each feature vector.

14. A computer program product, the computer program product comprising a computer readable storage medium having program instructions embodied therewith, the program instructions executable by a computer to cause the computer to:
provide a set of records, each record of the set of records having a set of attributes, wherein the set of attributes include a first subset of attributes and a second set of attributes;
receive a first trained data representation learning model comprising a first subset of attribute level trained data representation learning models associated with the first subset of attributes respectively, wherein the first trained data representation learning model is configured to receive values of the first subset of attributes of a record and to output a feature vector of the record by:
input a value of each attribute of the first subset of attributes into the associated attribute level trained data representation model of the first subset of attribute level trained data representation learning models;
receive an individual feature vector from each of the attribute level trained data representation models of the first subset of attribute level trained data representation learning models; and
combine the individual feature vectors to obtain each feature vector;
provide for the second subset of attributes a second subset of attribute level data representation learning models, each attribute level data representation learning model of the second subset being configured to generate a feature vector for a respective attribute of the second subset of attributes;
create a data representation learning model comprising the first trained data representation learning model and the second subset of attribute level data representation learning models;
train the data representation learning model, thereby generating a trained data representation learning model;
input values of the set of attributes of the set of records to the trained data representation learning model;
receive, as an output of the trained data representation learning model, a set of feature vectors representing the set of records respectively; and
access a first record from the set of records based on the set of feature vectors.

15. The computer program product of claim 14, wherein the instructions further cause the computer to:
receive a further record having the set of attributes;
input values of the set of attributes of the received further record to the trained data representation learning model, thereby obtaining a feature vector of the received further record from the trained data representation learning model;
compare the obtained feature vector with at least part of the set of feature vectors for determining a matching level of the obtained feature vector with the set of feature vectors; and
store the obtained feature vector and/or received further record based on the matching level.

16. The computer program product of claim 14, wherein the instructions further cause the computer to:
cluster the set of feature vectors into clusters of feature vectors;
associate each of the set of feature vectors with cluster information indicative of a corresponding cluster from the clusters of feature vectors;
store the cluster of feature vectors.

17. The computer program product of claim 15, wherein the instructions further cause the computer to:
cluster the set of feature vectors into clusters of feature vectors;
store the clusters of feature vectors; and
determine a distance between the obtained feature vector and a vector representing each cluster of the clusters of feature vectors, wherein the at least part of the set of feature vectors comprises the cluster represented by the vector with a closest distance to the obtained feature vector.

18. The computer program product of claim 15, wherein the record is received as part of a create or update operation.

19. The computer program product of claim 14, wherein the trained data representation learning model being configured to process the input values in parallel.

20. The computer program product of claim 14, the trained data representation learning model further comprising a set of trained weights, each weight of the set of weights being associated with a respective attribute of the set of attributes, wherein the combining further cause the computer to weight each of the individual feature vectors with a respective trained weight of the set of trained weights.

21. The computer program product of claim 14, wherein each of the attribute level trained data representation models being a neural network.

22. The computer program product of claim 14, wherein the trained data representation learning model being trained for optimizing a loss function, the loss function being a measure of a similarity between feature vectors of pairs of records, the measure of similarity being a combination of individual similarities, each individual similarity of the individual similarities indicating a similarity of two individual feature vectors generated for the same attribute in the pair of records.

23. The computer program product of claim 14, wherein the trained data representation learning model being trained for optimizing a loss function, the loss function being a measure of a similarity between feature vectors of a pair of records.

24. The computer program product of claim 14, wherein the trained data representation learning model comprising at least one neural network that is trained in accordance with a Twin Neural Network architecture.

25. A system, comprising:
a memory; and
a central processing unit (CPU) coupled to the memory, the CPU configured to execute instructions to:
provide a set of records, each record of the set of records having a set of attributes, wherein the set of attributes include a first subset of attributes and a second set of attributes;
receive a first trained data representation learning model comprising a first subset of attribute level trained data representation learning models associated with the first subset of attributes respectively, wherein the first trained data representation learning model is configured to receive values of the first subset of attributes of a record and to output a feature vector of the record by:
input a value of each attribute of the first subset of attributes into the associated attribute level trained data representation model of the first subset of attribute level trained data representation learning models;
receive an individual feature vector from each of the attribute level trained data representation models of the first subset of attribute level trained data representation learning models; and
combine the individual feature vectors to obtain each feature vector;
provide for the second subset of attributes a second subset of attribute level data representation learning models, each attribute level data representation learning model of the second subset being configured to generate a feature vector for a respective attribute of the second subset of attributes;
create a data representation learning model comprising the first trained data representation learning model and the second subset of attribute level data representation learning models;
train the data representation learning model, thereby generating a trained data representation learning model;
input values of the set of attributes of the set of records to the trained data representation learning model;
receive, as an output of the trained data representation learning model, a set of feature vectors representing the set of records respectively; and
access a first record from the set of records based on the set of feature vectors.

* * * * *